(12) United States Patent
Burkey et al.

(10) Patent No.: US 11,963,487 B2
(45) Date of Patent: Apr. 23, 2024

(54) PREVENTATIVE FAILURE FOR AGRICULTURAL APPLICATIONS

(71) Applicant: REALMFIVE, Inc., Lincoln, NE (US)

(72) Inventors: Brant Burkey, Denton, NE (US); Mateusz Mittek, Lincoln, NE (US); Austin Benes, Lincoln, NE (US); Steve R. Tippery, Gretna, NE (US)

(73) Assignee: REALMFIVE, INC., Lincoln, NE (US)

( * ) Notice: Subject to any disclaimer, the term of this patent is extended or adjusted under 35 U.S.C. 154(b) by 228 days.

(21) Appl. No.: 17/568,401

(22) Filed: Jan. 4, 2022

(65) Prior Publication Data
US 2022/0312698 A1 Oct. 6, 2022

Related U.S. Application Data

(60) Provisional application No. 63/188,340, filed on May 13, 2021, provisional application No. 63/133,722, filed on Jan. 4, 2021.

(51) Int. Cl.
A01G 25/16 (2006.01)
A01K 5/02 (2006.01)
A01K 29/00 (2006.01)
G06Q 10/063 (2023.01)
(Continued)

(52) U.S. Cl.
CPC .......... *A01G 25/167* (2013.01); *A01K 5/0225* (2013.01); *A01K 29/005* (2013.01); *G06Q 10/063* (2013.01); *G06Q 50/02* (2013.01); *G16Y 10/05* (2020.01)

(58) Field of Classification Search
CPC .... A01G 25/16; A01G 25/167; A01K 5/0225; A01K 29/005; A01K 29/00; G06Q 10/063; G06Q 50/02; G16Y 10/05
See application file for complete search history.

(56) References Cited

U.S. PATENT DOCUMENTS

| 11,039,269 B2 | 6/2021 | Tippery et al. |
| 2017/0095206 A1* | 4/2017 | Leib .................. A61B 5/14542 |
| 2019/0187086 A1 | 6/2019 | Burkey et al. |

(Continued)

FOREIGN PATENT DOCUMENTS

| DE | 102016103619 B4 * | 6/2020 | ........... A01K 5/0275 |
| EP | 1112680 A2 * | 7/2001 | ............. A01G 31/00 |

(Continued)

OTHER PUBLICATIONS

Berckmans, Dries et al., "Animal Sound . . . Talks! Real-Time Sound Analysis for Health Monitoring in Livestock", Int. Symp. on Animal Environ. & Welfare, Oct. 23-26, Chongqing, China, 8 pages.

(Continued)

*Primary Examiner* — Ebony E Evans
(74) *Attorney, Agent, or Firm* — Suiter Swantz IP

(57) ABSTRACT

A sensor system is described. The sensor system includes one or more sensor nodes. The sensor nodes are communicatively coupled to a server by way of a network. The sensor nodes may be communicatively coupled to the network by a cellular connection or a LoRa connection to a gateway. The sensor node may measure a variety of information associated with a transport environment, a confined animal feeding environment, or another agricultural environment.

32 Claims, 28 Drawing Sheets

(51) Int. Cl.
*G06Q 50/02* (2012.01)
*G16Y 10/05* (2020.01)

(56) References Cited

U.S. PATENT DOCUMENTS

| | | |
|---|---|---|
| 2019/0289826 A1* | 9/2019 | Tippery ................. G06N 20/20 |
| 2020/0125849 A1* | 4/2020 | Labrecque ............. H04N 23/54 |
| 2020/0305366 A1 | 10/2020 | Burkey et al. |
| 2021/0025747 A1 | 1/2021 | Burkey et al. |
| 2021/0144901 A1 | 5/2021 | Tippery et al. |
| 2021/0341407 A1 | 11/2021 | Burkey et al. |

FOREIGN PATENT DOCUMENTS

| | | | | |
|---|---|---|---|---|
| WO | WO-9310659 A2 * | 6/1993 | ............. | A01K 39/01 |
| WO | WO-2010021652 A1 * | 2/2010 | ............... | G01S 5/02 |

OTHER PUBLICATIONS

Haden BS, Cara et al., "Assessing production parameters and economic impact of swine influenza, PRRS and Micoplasma hyopneumoniae on finishing pigs in a large production system", Iowa State University, downloaded Jan. 4, 2022, 3 pages.

Mote, Benny, "Automated computer vision system for tracking individual pig activity and locomotion in nursery/finisher group housing—NPB #18-149", Research Report, Animal Welfare, pork checkoff, Nov. 6, 2020, 13 pages.

International Search Report and Written Opinion in International Application No. PCT/US2022/011122 dated Mar. 30, 2022, 8 pages.

\* cited by examiner

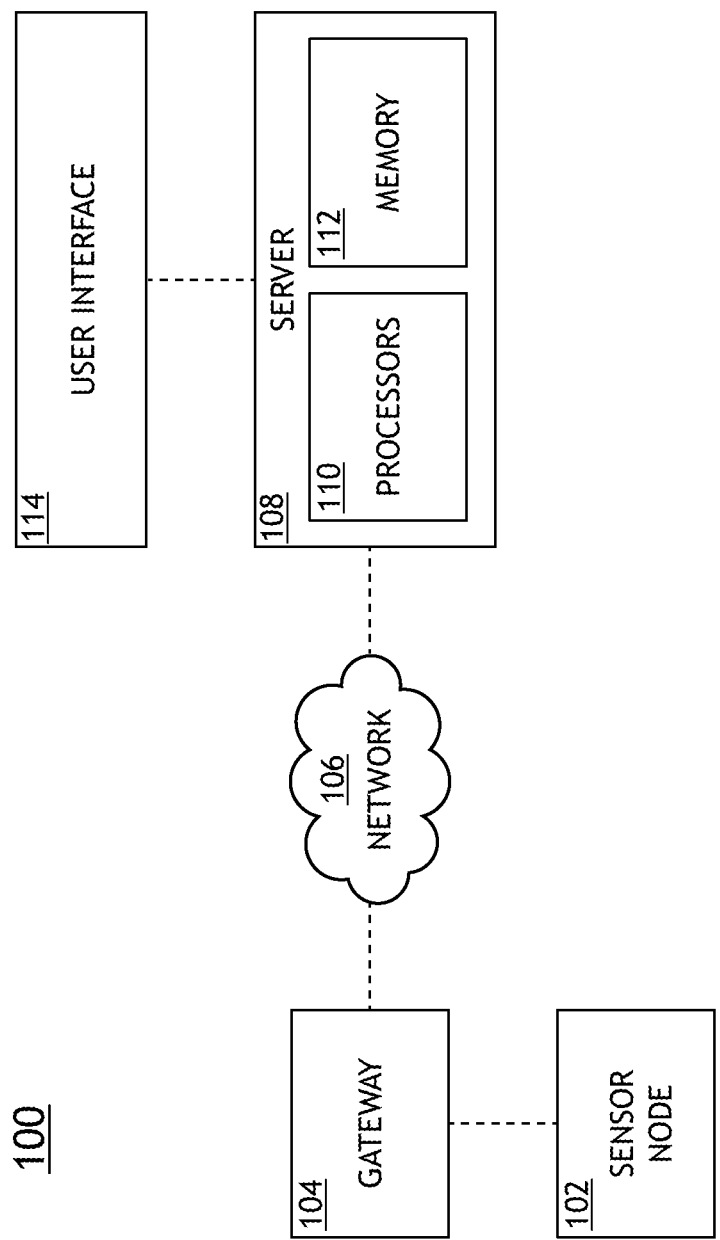

104

104

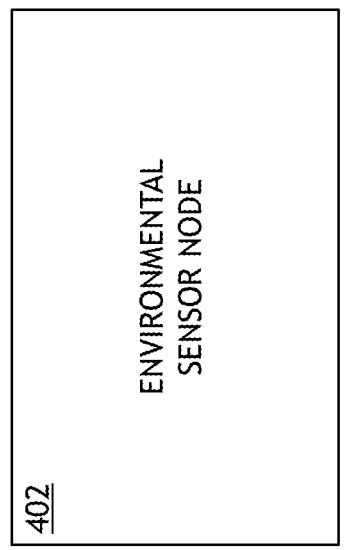

100
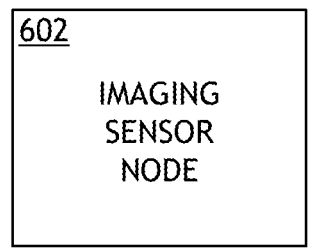
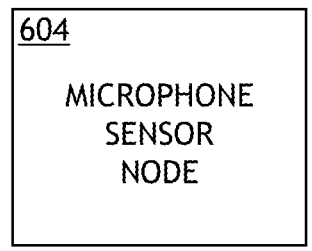
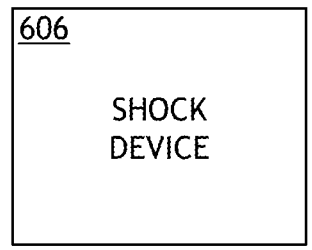
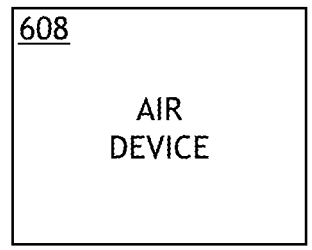
FIG.6

100
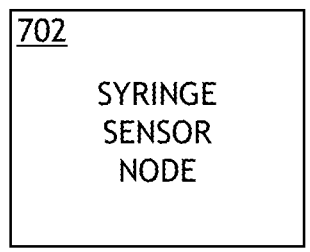
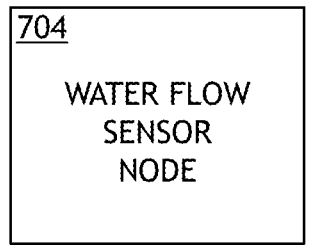
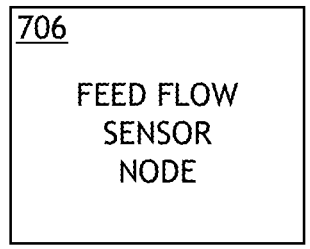
FIG.7

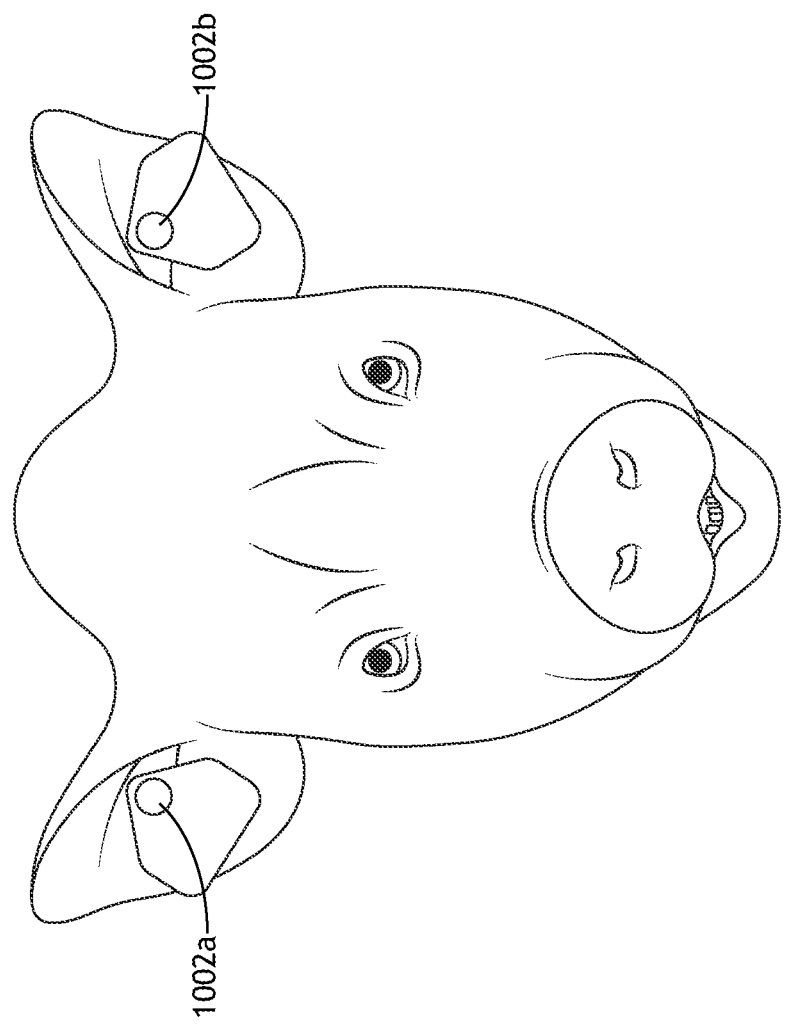

114

---

SITE LIST/

SITE FRIENDLY NAME 1

| LIVESTOCK | ENVIRONMENT |
|---|---|
| 12,000 | ⊙5 ⚠3 ⊗2 |

| WATER | FEED |
|---|---|
| ⊙2 ⊘1 | ⊙8 ⚠2 ⊗1 ⊘1 |

EFFLUENT

⊙1 ⚠1 ⊗1

SITE FRIENDLY NAME 2

| LIVESTOCK | ENVIRONMENT |
|---|---|
| 9,000 | ⊙2 ⚠3 ⊗1 |

| WATER | FEED |
|---|---|
| ⊙2 ⊘1 | ⊙2 ⚠1 ⊗2 |

EFFLUENT

```
SITE LIST/SITE 1/

BARN FRIENDLY NAME 2
LIVESTOCK         2,600
ENVIRONMENT       ⊙1  ⚠2
WATER             1.7 GAL HOUR
FEED              ⊙2  ⚠1  ⊗1
EFFLUENT
DEVICE FRIENDLY NAME 1
[====|       |        ) 34%

BARN FRIENDLY NAME 2
LIVESTOCK         2,600
ENVIRONMENT       ⊙1  ⚠2
WATER             1.7 GAL HOUR
FEED              ⊙2  ⚠1  ⊗1
EFFLUENT
DEVICE FRIENDLY NAME 1
[====|       |        ) 34%
```

PREVENTATIVE FAILURE FOR AGRICULTURAL APPLICATIONS

CROSS REFERENCE TO RELATED APPLICATION

The present application claims the benefit under 35 U.S.C. § 119(e) of the following provisional patent applications: U.S. Provisional Patent Application Ser. No. 63/133,722, filed on Jan. 4, 2021, titled PREVENTATIVE FAILURE FOR AGRICULTURAL APPLICATIONS and U.S. Provisional Patent Application Ser. No. 63/188,340, filed on May 13, 2021, titled PREVENTATIVE FAILURE FOR AGRICULTURAL APPLICATIONS, whereby each of the above-listed applications is incorporated herein by reference in the entirety.

TECHNICAL FIELD

The present invention generally relates to production crop and livestock and agriculture, and more particularly to integrated sensor systems for informing and carrying out management activities.

BACKGROUND

A problem in the production of livestock protein is the availability of qualified and reliable labor. Fewer people are returning to the farm and so it has become harder to find people that have crop and animal husbandry experience. As a result, managers of farming operations continue to turn to technology to help them better manage their crops, livestock, grain storage systems, inventory, irrigation systems, and machinery, which are typically located in remote areas. Livestock managers are concerned about issues such as animal profitability, animal health and comfort, technology ease of use, environmental regulation, animal welfare, sustainability, climate change and the like. Crop producers are concerned about crop performance and field profitability, environment, water use, machinery up-time, logistics, grain storage, and the like. A number of technology monitoring and control solutions exist, but such solutions may be complex and expensive to install, difficult to use, and are not interoperable with other systems. Therefore, it would be advantageous that a hardware-enabled intelligent system that enables data and/or control to be implemented remotely, including methods that cure the shortcomings described above.

SUMMARY

A sensor system is described in accordance with one or more embodiments of the present disclosure. In one illustrative embodiment, the sensor system includes a plurality of sensor nodes disposed within an agricultural environment. In another illustrative embodiment, the sensor system includes a server including one or more processors and a memory. In another illustrative embodiment, the one or more processors are configured to execute a set of program instructions maintained on the memory (edge computing). In another illustrative embodiment, the set of program instructions are configured to cause the one or more processors to receive sensor data from the plurality of sensor nodes. In another illustrative embodiment, the set of program instructions are configured to cause the one or more processors to provide a display on a user interface based on the sensor data.

In another illustrative embodiment, the set of program instructions are configured to identify a preventative failure condition based on the received sensor data.

In another illustrative embodiment, the set of program instructions are configured to identify the preventive failure condition by determining one or more sensor values are outside of a selected range.

In another illustrative embodiment, the set of program instructions are configured to apply a machine learning algorithm to the received sensor data to identify the preventative failure condition.

In another illustrative embodiment, the sensor system includes a feed bin, a feed tube configured to provide a pathway for feed from the feed bin, and a motor configured to convey the feed from the feed bin by the feed tube. In another illustrative embodiment, the plurality of sensor nodes comprises a feed tube sensor node are configured to detect a vibration of the feed tube.

In another illustrative embodiment, at least one of the feed tube sensor node or the server is configured to determine when the feed bin is one of bridged or empty based on the sensor data from the feed tube sensor node.

In another illustrative embodiment, the feed tube sensor node is configured to provide the sensor data from the feed tube sensor node to the server in response to determining the feed bin is one of bridged or empty.

In another illustrative embodiment, the sensor system includes a feed bin sensor node configured to detect a feed level of the feed bin; wherein at least one of the feed tube sensor node, or the server is configured to determine the feed bin is one of bridged or empty based on the feed level and the sensor data from the feed tube sensor node.

In another illustrative embodiment, at least one of the feed tube sensor node, or the server is configured to determine a forecast in which the feed bin is expected to be empty based on at least one of the feed level and the sensor data from the feed tube sensor node, wherein the display on the user interface includes the forecast.

In another illustrative embodiment, the forecast is determined based on at least one of a fill date of the feed bin or a fill amount of the feed bin.

In another illustrative embodiment, the forecast is determined based on one of a linear regression or a machine learning algorithm.

In another illustrative embodiment, the feed bin is a first feed bin. In another illustrative embodiment, the sensor system includes a second feed bin and a switch configured to switch a feed source between the first feed bin and the second feed bin. In another illustrative embodiment, the feed tube is configured to convey feed from the feed source based on the switch. In another illustrative embodiment, the feed tube sensor node is configured to generate sensor data indicating an acceleration of the switch for determining the feed source has been changed.

In another illustrative embodiment, the feed tube sensor node includes at least one of a mounting bracket or an adhesive configured to mount the feed tube sensor node to the feed tube.

In another illustrative embodiment, the sensor system includes a feed bin. In another illustrative embodiment, the plurality of sensor nodes include a feed level sensor node configured to detect a feed level of the feed bin.

In another illustrative embodiment, the feed level sensor node is configured to detect signals from a feed truck for at least one of confirming a delivery time, a type of feed delivered, or a delivery of a feed ration to at least one of a bin, a room, or a barn.

In another illustrative embodiment, the feed level sensor node is configured to emit an identification signal for preventing a feed truck conveyance system from conveying feed to the feed bin.

In another illustrative embodiment, the sensor system includes a gateway communicatively coupled to the plurality of sensor nodes, wherein the gateway is configured to collect sensor data from at least one of the plurality of sensor nodes, wherein the gateway is communicatively coupled to the server by at least one of a wired or a wireless connection to a network.

In another illustrative embodiment, the gateway includes at least one of a magnet or an adhesive, wherein the gateway is configured to mount to feed bin by at least one of the magnet or the adhesive.

In another illustrative embodiment, the plurality of sensor nodes are communicatively coupled to the server by one or more of a cellular connection, a satellite connection, or a Wi-Fi connection to a network.

In another illustrative embodiment, the sensor system includes a water tank. In another illustrative embodiment, the plurality of sensors nodes include a water flow sensor node configured to generate sensor data indicating a flow rate of water from the water tank or a pressurized water line.

In another illustrative embodiment, at least one of the water flow sensor node or the server is configured to identify a water usage profile identifying one or more of a shower-in event or a shower-out event based on the flow rate.

In another illustrative embodiment, at least one of the water flow sensor node or the server is configured to identify at least one of a beginning of a livestock growth cycle, an end of the livestock growth cycle, a weight of livestock, a health issue, or when a barn is being soaked prior to power washing based on at least the flow rate.

In another illustrative embodiment, at least one of the water flow sensor node or the server is configured to identify at least one of the beginning of the livestock growth cycle or the end of the livestock growth cycle based on the flow rate and at least one of a temperature or a humidity.

In another illustrative embodiment, at least one of the water flow sensor node or the server is configured to identify at least one of the weight or health of at least one of the livestock or a livestock pen based on the flow rate and at least one of a number of livestock, a type of the livestock, a breed of the livestock, or a feed usage.

In another illustrative embodiment, the weight of the livestock is further identified based on a camera based animal activity data.

In another illustrative embodiment, at least one of the water flow sensor node or the server is configured to identify a failure mode of a water line based on the flow rate.

In another illustrative embodiment, the sensor system includes at least one of a water tank, a pit, a pond, or a lagoon. In another illustrative embodiment, the plurality of sensor nodes includes a water float sensor node configured to float in at least one of the water tank, the pit, the pond, or the lagoon and generate sensor data for detecting a level of water in at least one of the water tank, the pit, the pond, or the lagoon.

In another illustrative embodiment, the water float sensor node comprises a battery pack and a reed switch, wherein the water float sensor node is configured to be powered by the battery pack upon removing a magnetic field from the reed switch.

In another illustrative embodiment, the water float sensor node comprises a temperature sensor for measuring at least one of a temperature of the water in at least one of the water tank, the pit, the pond, or the lagoon or an ambient temperature.

In another illustrative embodiment, the sensor data includes real time kinematic (RTK) global positioning system (GPS) sensor data for determining the level of water in the water tank.

In another illustrative embodiment, the sensor system includes a water tank including a heater. In another illustrative embodiment, the plurality of sensor nodes includes a temperature sensor node for measuring at least one of a temperature of the water in the water tank or an ambient temperature, wherein at least one of the temperature sensor node or the server is configured to control the heater based on at least one of the temperature of the water in the water tank or the ambient temperature.

In another illustrative embodiment, the temperature sensor node is configured to detect an identification of livestock in proximity to the water tank.

In another illustrative embodiment, the temperature sensor node is configured to receive biometric information associated with the livestock in proximity to the water tank; wherein at least one of the temperature sensor node or the server is configured to determine a health of the livestock based on at least one of the temperature of the water, the ambient temperature, the identification of the livestock, or the biometric information of the livestock.

In another illustrative embodiment, the sensor system includes a chokepoint, wherein the plurality of sensor nodes comprises a livestock counter sensor node configured to generate sensor data for counting livestock passing through the chokepoint and associate the sensor data to a specific animal.

In another illustrative embodiment, the livestock counter sensor node comprises a camera, wherein at least one of the livestock counter sensor node or the server is configured to count the livestock passing through the chokepoint by performing image recognition on the sensor data and comparing to a specific animal number.

In another illustrative embodiment, the livestock counter sensor node comprises a radar.

In another illustrative embodiment, the chokepoint comprises at least one of a gate, a door, a trailer compartment, a pen, a scale, an automatic feeder, or an automatic milker.

In another illustrative embodiment, at least one of the livestock counter sensor node or the server is configured to update an enterprise resource planning system with the count of the livestock passing through the chokepoint.

In another illustrative embodiment, the chokepoint is configured to automatically open in response to identifying the livestock.

In another illustrative embodiment, the plurality of sensor nodes comprises a door sensor configured to determine a vibration or position of a door; wherein the set of program instructions are configured to cause the one or more processors to determine a state of the door based on the vibration or position of the door and timestamp the state of the door.

In another illustrative embodiment, the plurality of sensor nodes comprises an environmental sensor node configured to generate sensor data indicative of at least one of an air quality, a temperature, a humidity, an air pressure, or air speed.

In another illustrative embodiment, at least one of the environmental sensor node or the server is configured to determine at least one of the air quality, the temperature, the humidity, the air pressure or air speed is outside of a selected range, wherein the display provided to the user interface includes at least one of the air quality, the temperature, the humidity, the air pressure, or the air speed.

In another illustrative embodiment, at least one of the environmental sensor node or the server is configured to determine at least one of the air quality, the temperature, the humidity, the air pressure, or air speed is outside of a selected range and control at least one of a heating system, a ventilation system, or a cooling system to correct at least one of the air quality, the temperature, the humidity, the air pressure, or air speed within the selected range.

In another illustrative embodiment, the sensor system includes a gate, wherein the plurality of sensor nodes comprises a gate sensor node configured to generate vibration or position data indicative of a state of the gate, wherein at least one of the gate sensor node or the server is configured to detect a state of the gate based on the vibration or position data.

In another illustrative embodiment, at least one of the gate sensor node or the server is configured to timestamp the vibration or position data for determining a duration a user spent in a room accessible by the gate.

In another illustrative embodiment, the plurality of sensor nodes comprises an imaging sensor node, wherein at least one of the imaging sensor node or the server is configured to detect at least one of an activity, an aggression, a back fat, a leg geometry, a size of a loin, a weight, or a density of a livestock based on sensor data from the imaging sensor node.

In another illustrative embodiment, the display on the user interface includes an alert based on at least one of the activity, the aggression, the back fat, the leg geometry, the size of the loin, the weight, or the density of the livestock, wherein the alert is at least one of the livestock is fighting, the livestock has not gotten up for a period of time, the livestock needs to be milked, the livestock is in heat, the livestock needs water, the livestock is hungry, or the livestock is cold.

In another illustrative embodiment, the imaging sensor node comprises at least one of a hyperspectral camera including at least one of a radar, a lidar, or a microwave sensor.

In another illustrative embodiment, the display on the user interface includes an indication that the livestock includes at least one of a suitable back fat, a suitable leg geometry, a suitable size of loin, ideal characteristics for reproduction, or a suitable weight for slaughter.

In another illustrative embodiment, the plurality of sensor nodes comprises at least one of an imaging sensor node or a microphone sensor node configured to generate sensor data of a swine farrowing crate.

In another illustrative embodiment, at least one of the imaging sensor node or the server is configured to detect a sow laying on a piglet based on the sensor data from at least one of the imaging sensor node or the microphone sensor node.

In another illustrative embodiment, the sensor system includes at least one of a vibration device or an air device, wherein at least one of the imaging sensor node, the microphone sensor node or the server is configured to engage at least one of the vibration device or the air device in response to detecting the sow laying on the piglet.

In another illustrative embodiment, at least one of the imaging sensor node or the server is configured to detect a piglet that is not finding a teat of a sow, wherein the display on the user interface an indication that the piglet is not finding the teat of the sow.

In another illustrative embodiment, the plurality of sensor nodes comprises an imaging sensor node, wherein at least one of the imaging sensor node or the server is configured to detect livestock in estrus based on sensor data from the imaging sensor node.

In another illustrative embodiment, the plurality of sensor nodes comprises at least one of a syringe sensor node, a water flow sensor node, or a feed flow sensor node, wherein at least one of the syringe sensor node, the water flow sensor node, the feed flow sensor node, or the server is configured to track livestock which has received a medication.

In another illustrative embodiment, the sensor system includes at least one of an effluent tank, pond, lagoon, or pit; wherein the plurality of sensor nodes comprises at least one of an effluent float sensor node or an effluent level sensor node; wherein at least one of the effluent float sensor node, the effluent level sensor node, or the server is configured to determine a forecast in which at least one of the effluent tank, pond, lagoon, or pit is expected to be full based on sensor data from at least one of effluent float sensor node or the effluent level sensor node, wherein the display on the user interface includes the forecast.

In another illustrative embodiment, wherein the forecast is determined based on one of a linear regression or a machine learning algorithm.

In another illustrative embodiment, wherein the effluent float sensor node comprises a nutrient sensor configured detect a nutrient level of effluent within at least one of the effluent tank, pond, lagoon, or pit.

In another illustrative embodiment, wherein sensor data from the effluent float sensor node includes real time kinematic (RTK) global positioning system (GPS) sensor data for determining a vertical displacement of effluent within at least one of the tank, the pond, the lagoon, or the pit.

In another illustrative embodiment, wherein the effluent level sensor node comprises a radar to generate sensor data for determining a vertical displacement of effluent within at least one of the tank, the pond, the lagoon, or the pit.

In another illustrative embodiment, wherein the radar is further configured to sensor data for determining a height of foam within the effluent tank.

In another illustrative embodiment, the sensor system includes a temperature control equipment; wherein the plurality of sensor nodes comprises a power sensor node configured to generate sensor data indicative of a power usage of the temperature control equipment.

In another illustrative embodiment, the plurality of sensor nodes comprises an ear tag sensor node, wherein the ear tag sensor node includes a vibrational unit to vibrate for steering livestock.

In another illustrative embodiment, the server is configured to engage the vibrational unit for steering the livestock to a selected location.

In another illustrative embodiment, the display on the user interface is based on a selected context.

In another illustrative embodiment, the selected context is at least one of a user zoom level, a user permission, a user type, a season, a geolocation, an equipment type, a user selection, or an inferred data.

In another illustrative embodiment, the selected context is at least one of a site level, a barn level, a room level, or a floor level associated with the agricultural environment.

In another illustrative embodiment, the display includes at least one of a livestock quantity or a condition associated with the plurality of sensor nodes, wherein the plurality of sensor nodes comprises at least one of an environmental sensor node, a water sensor node, a feed sensor node, or an effluent sensor node.

In another illustrative embodiment, the display includes a warning condition associated with at least one of the plurality of sensor nodes, wherein the warning condition indicates at least one of the sensor data is not being received or the sensor data is outside of a selected range.

In another illustrative embodiment, the selected context is a selected sensor node of the plurality of sensor nodes, wherein the display includes readings from the selected sensor node, wherein the display includes a current condition of the selected sensor node.

In another illustrative embodiment, the display on the user interface is at least one of a visualization, a ranking, a chart, a graph, or a notification; wherein the display is one or more of triggered or organized based on the sensor data.

In another illustrative embodiment, the server is configured to automatically change the display on the user interface in response to receiving a user permission.

In another illustrative embodiment, the plurality of sensors comprises a sensor node configured to generate sensor data indicative of a temperature, a humidity, a water flow, a power consumption, and a vibration, wherein the sensor node is configured to process the sensor data.

A transport sensor system is described in accordance with one or more embodiments of the present disclosure. In one illustrative embodiment, the transport sensor system includes a trailer configured to haul livestock. In another illustrative embodiment, the transport sensor system includes a plurality of sensor nodes disposed within the trailer. In another illustrative embodiment, the transport sensor system includes a server including one or more processors and a memory. In another illustrative embodiment, the one or more processors are configured to execute a set of program instructions maintained on the memory. In another illustrative embodiment, the set of program instructions are configured to cause the one or more processors to receive sensor data from the plurality of sensor nodes. In another illustrative embodiment, the set of program instructions are configured to cause the one or more processors to provide a display on a user interface based on the sensor data.

In another illustrative embodiment, the set of program instructions are configured to identify a preventative failure condition based on the received sensor data.

In another illustrative embodiment, the set of program instructions are configured to identify the preventative failure condition by determining one or more sensor values are outside of a selected range.

In another illustrative embodiment, the set of program instructions are configured to apply a machine learning algorithm to the received sensor data to identify the preventative failure condition.

In another illustrative embodiment, the plurality of sensor nodes comprising a vibration sensor node configured to detect sensor data indicative of the vibration of the trailer.

In another illustrative embodiment, at least one of the vibration sensor node or the server is configured to log the sensor data indicative of vibration of the trailer.

In another illustrative embodiment, the trailer further comprises a gate, wherein the plurality of sensor nodes further comprises a gate sensor node configured to generate sensor data indicative of a state of the gate, wherein at least one of the gate sensor node or the server is configured to detect the state of the gate based on the sensor data from the gate sensor node.

In another illustrative embodiment, at least one of the gate sensor node or the server is configured to timestamp the sensor data from the gate sensor node for determining at least one of a loading duration or an unloading duration during which the gate is opened.

In another illustrative embodiment, the plurality of sensor nodes comprises a global positioning system (GPS) sensor node, wherein at least one of the GPS sensor node or the server is configured to generate a route of the trailer based on sensor data from the GPS sensor node.

In another illustrative embodiment, the display on the user interface includes an expected arrival time of the trailer based on the route of the trailer.

In another illustrative embodiment, the plurality of sensor nodes comprises a livestock counter sensor node configured to generate sensor data for counting livestock which are at least one of being loaded or unloaded from the trailer.

In another illustrative embodiment, the livestock counter sensor node comprises a camera, wherein at least one of the livestock counter sensor node or the server is configured to generate a count of the livestock by performing image recognition on sensor data from the camera.

In another illustrative embodiment, the livestock counter sensor node comprises a radar.

In another illustrative embodiment, the plurality of sensor nodes comprises a weight scale sensor node, wherein at least one of the weight scale sensor node, the livestock counter sensor node, or the server is configured to determine an average weight of livestock based on the count of livestock and sensor data from the weight scale sensor node.

In another illustrative embodiment, the plurality of sensor nodes comprises a water pressure sensor node configured to generate sensor data indicative of a cooling system of the trailer.

In another illustrative embodiment, the plurality of sensor nodes comprises an environmental sensor node configured to generate sensor data indicative of at least one of a temperature or a humidity within the trailer.

In another illustrative embodiment, at least one of the temperature or humidity within the trailer is timestamped.

In another illustrative embodiment, the plurality of sensor nodes comprises a global positioning system (GPS) sensor node, wherein at least one of the GPS sensor node or the server is configured to generate a route of the trailer based on sensor data from the GPS sensor node.

In another illustrative embodiment, the server is configured to contact trace the livestock based on the route of the trailer.

In another illustrative embodiment, the server is configured to identify a wash site on the route, wherein the server is configured to compare at least one of the temperature or the humidity within the trailer at the wash site to a threshold for determining an inside of the trailer was washed.

In another illustrative embodiment, the transport sensor system includes a gateway communicatively coupled to the plurality of sensor nodes, wherein the gateway is configured to collect sensor data from at least one of the plurality of sensor nodes, wherein the gateway is communicatively coupled to the server by a network.

In another illustrative embodiment, the plurality of sensor nodes are communicatively coupled to the server by a cellular connection to a network.

In another illustrative embodiment, the transport sensor system provides traceability of manure from a pit or lagoon, to a transport vehicle, and to a field; wherein the manure is provided by way of at least one of a honey wagon or a drag line.

In another illustrative embodiment, the transport sensor system provides traceability of manure from a pit or lagoon to a field; wherein the manure is provided by way of a pivot irrigation.

In another illustrative embodiment, the transport sensor system provides traceability of a crop harvest from a harvester, to at least one of a grain cart or a field buggy, to a tractor trailer, and to a crop storage location.

In another illustrative embodiment, the transport sensor system provides traceability of feed from a feed mill, to a feed truck, to at least one of a site or a feed bin.

In another illustrative embodiment, the feed is correlated to determine a correct delivery location.

In another illustrative embodiment, the transport sensor system provides traceability of livestock from a first barn to a second barn.

In another illustrative embodiment, the transport sensor system provides traceability of a crop from a field to a storage facility.

In another illustrative embodiment, the transport sensor system provides traceability of artificial fertilizer application from a storage site to a field.

In another illustrative embodiment, the trailer further comprises a truck feed conveyance system; wherein at least one of the plurality of sensor nodes or the server is configured to prevent the truck feed conveyance system from conveying feed to a feed bin in response to determining feed disposed within the trailer does not match a selected feed associated with the feed bin.

BRIEF DESCRIPTION OF THE DRAWINGS

Implementations of the concepts disclosed herein may be better understood when consideration is given to the following detailed description thereof. Such description refers to the included drawings, which are not necessarily to scale, and in which some features may be exaggerated, and some features may be omitted or may be represented schematically in the interest of clarity. Like reference numerals in the drawings may represent and refer to the same or similar element, feature, or function. In the drawings:

FIG. 1A illustrates a simplified block diagram of a sensor system, in accordance with one or more embodiments of the present disclosure;

FIG. 4 illustrates a simplified block diagram of a sensor node of a sensor system, in accordance with one or more embodiments of the present disclosure;

FIG. 6 illustrates a simplified block diagram of a shock device, an air device, and one or more sensor nodes of a sensor system, in accordance with one or more embodiments of the present disclosure;

FIG. 7 illustrates a simplified block diagram of one or more sensor nodes of a sensor system, in accordance with one or more embodiments of the present disclosure;

FIG. 10 illustrates a livestock animal including an ear tag of a sensor system, in accordance with one or more embodiments of the present disclosure;

FIG. 11A illustrates a user interface of a sensor system with a site list including a site level overview of one or more sites, in accordance with one or more embodiments of the present disclosure;

FIG. 11B illustrates a user interface of a sensor system with a barn list including a barn level overview of one or more barns present at a site, in accordance with one or more embodiments of the present disclosure;

DETAILED DESCRIPTION OF THE INVENTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure. Reference will now be made in detail to the subject matter disclosed, which is illustrated in the accompanying drawings.

Embodiments of the present disclosure are directed to a sensor system. The sensor system may include one or more sensor nodes. The sensor system may be embodied in barns or open lots. The sensor system may be installed in new barns or retrofit to existing barns. The sensor system may provide for monitoring of various failure modes, such as, but not limited to, air, feed, power, or water. Such monitoring may be advantageous in reducing the need for review of the failure modes by on-site staff. The sensor data may include vibration or accelerometer data and the like. The vibration data may be correlated to other data and then be identify one or more preventative failure conditions. In this regard, the data of the sensor node may be co-mingled with data from other smart devices to determine trends and behaviors. The sensor system may also be installed in equipment, such as, but not limited to, trucks, trailers, pickups, livestock equipment (e.g., scales), and the like. In this regard, the sensor system may provide asset tracking capability.

Figure 1B:
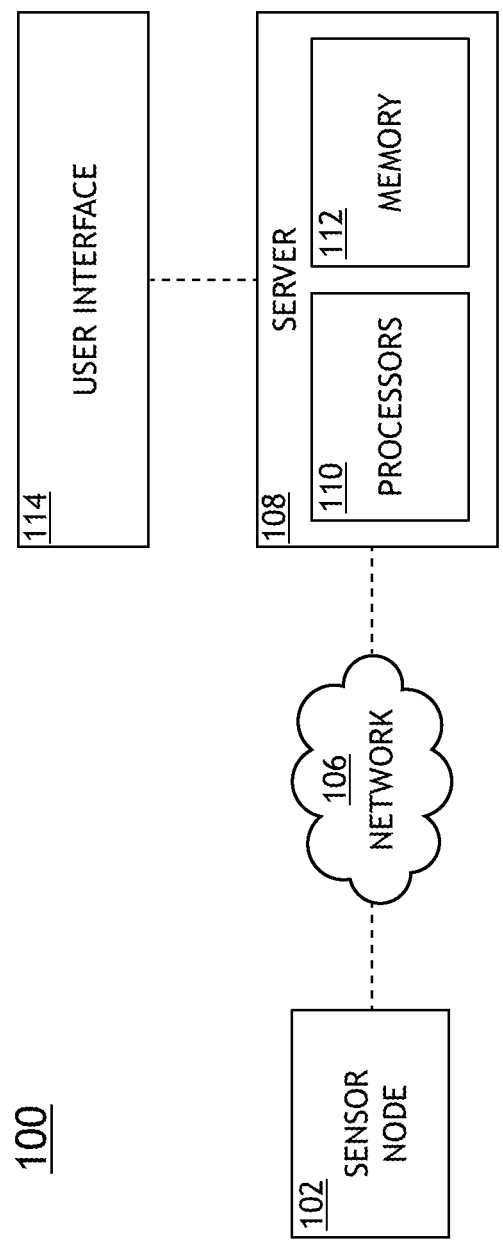
FIG. 1B illustrates a simplified block diagram of a sensor system, in accordance with one or more embodiments of the present disclosure.

FIGS. 1A-1B illustrates a simplified block diagram of a sensor system 100 for preventative failure detection in agricultural applications, in accordance with one or more embodiments of the present disclosure. In embodiments, the sensor system 100 may include one or more components, such as, but not limited to, sensor nodes 102, a gateway 104, a network 106, a server 108, or a user interface 114. One or more components of the sensor system 100, such as, the sensor nodes 102 and/or the gateway 104 may be disposed in a confined animal feeding operation (CAFO). CAFO is a term designated by the USDA as an operation in which over 1,000 animal units are confined for over 45 days a year. Although system 100 may be described as being implemented in an agricultural context, this is solely for illustrative purposes, and is not to intended as a limitation of the present disclosure, unless noted otherwise herein. As will be described in further detail herein, the sensor nodes 102 of the present disclosure may be implemented in a wide variety of contexts and may measure a wide variety of characteristics of the associated environment.

A number of physical properties may be sensed by the sensor nodes 102 for observation and display to the user interface 114. The sensor nodes 102 may be configured to measure a variety of data, as will be discussed in greater detail herein. For example, the sensor nodes 102 may include, but are not limited to, one or more of feed weight sensor node 208, pressure plate sensor node 210, feed level sensor node 212, feed tube sensor node 214, motor vibration sensor node 216, water flow sensor node 304, water level float sensor node 310, environmental sensor node 402, livestock counter sensor node 504, gate sensor node 506, imaging sensor node 602, microphone sensor node 604, syringe sensor node 702, water flow sensor node 704, feed flow sensor node 706, effluent float sensor node 804, effluent level sensor node 806, power sensor node 902, ear tag sensor node 1002, and the like. One or more of the sensor nodes 102, the gateway 104, or the server may be configured to determine a preventative failure condition.

For example, the preventative failure condition may be an expected empty or full condition for feed, effluent, water, and the like. A date for the expected empty or full condition may be predicted based on one or more of level data or vibration data. If sufficient processing power is available, the expected empty or full condition may be edge processed by the sensor nodes. In this regard, the sensor node 102 may maintain a volume of the container (e.g., feed bin, effluent tank, water tank, and the like) in local memory. The sensor node 102 may further calculate a rate of change of the feed, effluent, or water based on one or more of the level data or the vibration data. Similarly, the server 108 may maintain a volume of the container in cloud memory. The server 108 may receive one or more of the level data or the vibration data by way of the network 106 and may further calculate a rate of change of the feed, effluent, or water based on one or more of the level data or the vibration data.

By way of another example, the preventative failure condition may be an air quality condition. The sensor node 102 may generate sensor data indicative of the air quality. If sufficient processing power is available, the expected empty or full condition may be edge processed by the sensor nodes. In this regard, the sensor node 102 may maintain a threshold air quality level in local memory. The sensor node 102 may further compare the sensor data with the threshold air quality level to determine if the air quality condition has fallen below an acceptable tolerance. The sensor node 102 may further be configured to affect the control of local air quality remediation methods, such as a fan and the like. Similarly, the server 108 may maintain the threshold air quality level in cloud memory. The server 108 may receive the air quality sensor data by way of the network 106 and may further determine compare the sensor data with the threshold air quality level to determine if the air quality condition has fallen below an acceptable tolerance. The server 108 may further include calculations for growth impacts based on air quality trends. Comparisons across barns and sites may also be performed to rank performance and predict where remediation is most important. The server 108 may further process air quality sensor data for comparing expected methane output to actual methane output. The server 108 may further predict when an expected methane output would exceed an acceptable methane tolerance. Such prediction may then be provided to a nutritionist for adjusting a diet for the maintenance of carbon intensity scoring to stay under levels required for certification or compliance.

Sensor systems are generally described in U.S. Pat. No. 11,039,269, filed on Oct. 28, 2019, titled "SYSTEM AND METHOD FOR PROXIMITY-BASED ANALYSIS OF MULTIPLE AGRICULTURAL ENTITIES", U.S. patent application Ser. No. 16/215,261, Publication No. 2019/0187086, filed on Dec. 10, 2018, titled "SYSTEM AND METHOD FOR UNDERGROUND WIRELESS SENSOR COMMUNICATION", U.S. patent application Ser. No. 16/390,736, Publication No. 2019/0289826, filed on Apr. 22, 2019, titled "FULL LIVESTOCK SYSTEM", U.S. patent application Ser. No. 16/830,085, Publication No. 2020/0305366, filed on Mar. 25, 2020, titled "SMART IRRIGATION SYSTEM", U.S. patent application Ser. No. 16/936,304, Publication No. 2021/0025747, filed on Jul. 22, 2020, titled "SYSTEM AND METHOD OF LIQUID LEVEL MONITORING", U.S. patent application Ser. No. 16/940,341, Publication No. 2021/0144901, filed on Jul. 27, 2020, titled "AUTONOMOUS INTEGRATED FARMING SYSTEM", and U.S. patent application Ser. No. 17/373,527, Publication No. 2021/0341407, filed on Jul. 12, 2021, titled "SENSOR FOR UNDERGROUND SOIL MEASUREMENT", which are incorporated herein by reference in the entirety.

In embodiments, the sensor nodes 102 may be configured to store collected data in memory. The sensor nodes 102 may further be configured to execute one or more program instructions on the collected data by edge processing, or the like. In cases where data is sampled and then compared or an algorithm is applied, such processing can be performed in the cloud or on board the sensor node logging the data. For example, the sensor node 102 may accept a configuration from the user. When the sensor data is sampled to understand if an outage is occurring, the sensor node 102 may process the sensor data on board while the sensor node is disposed in the barn. The sensor node 102 processes the data and can identify the outage without having to send raw data to the server 108 to be processed. The processing by the sensor node 102 may allow for faster problem identification and less reliance on a reliable data connection to the network 106. The ability to process the data in situ may be advantageous when it is hard to get data and especially significant volumes of raw data to the cloud where work can be done to understand if an anomaly worth reporting has occurred.

The sensor nodes 102 may also transmit the data to the server 108 for cloud computing. The sensor system 100 may include a connectivity architecture including one or more of mobile applications, cellular connected devices, satellite-connected devices, or gateway connected devices for moving data to or from the server 108. In embodiments, the sensor nodes 102 may be communicatively coupled to one or more components of the sensor system 100, such as, but not limited to, the gateway 104, the network 106, or one or more additional sensor nodes. The sensor nodes 102 may be communicatively coupled to such components via one or more wireline-based interface devices (e.g., DSL-based interconnection, cable-based connection, T9-based interconnection, and the like), or one or more wireless-based interface devices employing GSM, GPRS, CDMA, EV-DO, EDGE, WiMAX, 3G, 4G, LTE, 5G, 6G, ISM, Wi-Fi protocols, RF, and the like. The one or more sensor nodes 102 may be configured to operate using one or more communication protocols, including, without limitation, Bluetooth, Zigbee, LoRa, or the like. It is further noted herein that the one or more components of system 100 may be communicatively coupled to the various other components of system 100 in any manner known in the art.

In embodiments, the sensor nodes 102 may communicate with the gateway 104 in any suitable network topology, such as, but not limited to, a star network topology (e.g., spoke-hub) or a mesh network (e.g., by way of one or more additional sensor nodes). For example, the sensor nodes 102 may be configured to transmit data to the gateway 104 using LoRa. LoRa wireless radio technology is often used to transmit small amounts of data over longer distances. It is noted herein that LoRa radio technology has been found to provide reliable long-distance data transmission even in conditions which would ordinarily pose issues using other data transmission techniques due to electromagnetic shielding. For instance, agricultural crop canopies, such as corn, may strongly absorb radio waves, leading to poor RF transmission in such conditions. On the other hand, LoRa has been found to provide reliable long-distance transmissions in such conditions. These characteristics of LoRa may make LoRa a good candidate for data transmission in sub-surface environments, such as sensor system 100. However, it is noted herein that LoRa wireless radio technology is often used to transmit small amounts of data over longer distances, but may be inappropriate to wirelessly transmit large amounts of data. As such, alternative wireless data transmission techniques may be required in systems which require large amounts of data transmission.

In embodiments, the sensor nodes 102 may be communicatively coupled to the network 106 directly (see FIG. 1B) or by way of the gateway 104 (see FIG. 1A). It is further noted herein that the ability of sensor nodes 102 to receive, store, and transmit data collected by additional sensor nodes allow the sensor nodes 102 to effectively increase the data transmission range of the additional sensor nodes. For the purposes of the present disclosure, the sensor nodes 102 may be said to function as "repeaters" and/or "store-and-forward sensor nodes" in that they are configured to receive data from additional sensor nodes, store the received data, and transmit the stored data to other components in system 100.

The gateway 104 may be positioned in a location which will minimize data transmission interferences, such as atop a barn, grain storage facility (e.g., silo), cellular tower, power line, and the like. Positioning the gateway 104 to minimize interference with topography, biomass, or other obstructions (e.g., trees, buildings, hills, and the like) may increase the efficiency of data transmission between the gateway 104 and the sensor nodes 102, as well as between the gateway 104 and the network 106. The gateway 104 may be positioned at a location which will maximize data connectivity and transmission and/or maximize the number of sensor nodes 102 which may be communicatively coupled to the gateway 104. By connecting to the gateway 104, the sensor nodes 102 can be rapidly connected to the network 106. The gateway 104 may also store the sensor data in a local memory and/or handle the processing by edge computing. In embodiments, the sensor system 100 includes multiple of the gateways 104 which are communicatively coupled to the network 106. It is noted herein that by multiple of the gateways 104 may increase data transmission efficiency and the area covered by system 100.

The server 108 may include one or more processors 110 and a memory 112. It is contemplated herein that the server 108 may comprise a remote server configured to carry out one or more of the steps of the present disclosure. In embodiments, server 108 may include a cloud-based computing platform including, but not limited to, Amazon Web Services (AWS). In embodiments, one or more processors 110 of server 108 may be configured to store information received from the sensor nodes in memory 112. The one or more processors 110 may be further configured to execute a set of program instructions stored in memory 112, the program instructions configured to cause the one or more processors 110 to carry out one or more steps of the present disclosure.

For example, the data collected by the sensor nodes 102 may be transmitted to server 108 via network 106. In embodiments, the data is sent to the server 108 together with one or more of a time stamps, site identification, barn identification, room identification, pen identification, and/or a global positioning system (GPS) location. The one or more processors 110 may also be configured to time-stamp and store received data in memory 112. The one or more processors 110 may be further configured to filter and sort stored data. The one or more processors 110 may be further configured to perform one or more operations on received and stored data.

In embodiments, the system 100 may include the user interface 114. The user interface 114 may be communicatively coupled to the server 108. The user interface 114 may include a display used to display data of the sensor system 100 to a user. The display of the user interface 114 may include any display known in the art. For example, the display may include, but is not limited to, a liquid crystal display (LCD), an organic light-emitting diode (OLED) based display, or a CRT display. Those skilled in the art should recognize that any display device capable of integration with a user interface 114 is suitable for implementation in the present disclosure. In embodiments, a user may input selections and/or instructions responsive to data displayed to the user via the user interface 114. In embodiments, the user interface 114 may include, but is not limited to, one or more desktops, laptops, tablets, smartphones, smart watches, or the like. In embodiments, a user may use the user interface 114 in order to view data collected by the sensor nodes 102, generated by the one or more processors 110, or stored in memory 112. In embodiments, the user interface 114 may be configured to receive one or more input commands from a user, wherein the one or more input commands are configured to cause one or more processors to adjust one or more characteristics of the sensor system 100. For example, one or more of the processors 110 may be configured to transmit one or more alerts to a user, wherein the user interface 114 is configured to display the one or more alerts to the user via the display. The one or more alerts generated by system 100 and displayed via display may include any alert known in the art including, but not limited to, automated phone calls, text messages, emails, application notifications, banners, push notifications, and the like. By way of another example, the user interface 114 may provide a display of information from the sensor nodes 102.

The user interface 114 may include a display providing visualization of data from the sensor nodes 102. The visualization may include a view used to digest and present device and application data. The view may include a number of components. For example, the view may include data from sensors, users, or applications data such as third-party data, user entered data, or data from application programming interfaces. The view may also include one or more visualizations, rankings, charts, graphs, or notifications triggered or organized by an algorithm. In embodiments, the server is configured to include control logic whereby the server automatically changes the display once the server receives a user permission. The user permission may be given by the user interface or from the sensor nodes. Views (also referred to as card views, barn views, and the like) may change the visualization provided on the user interface based on a context. The context may modify the data that is fed into the algorithm or even change the algorithm or visualization itself. The context may include, but is not limited to, user zoom level, user permissions, user type, season, geo-location, equipment type, device type, user selection, inferred data, and the like. The context may also include of a site level, a barn level, a room level, or a floor level associated with the agricultural environment. The display may also include one or more of a livestock quantity or a condition associated with the sensor nodes, such as when the sensor nodes include one or more of an environmental sensor node, a water sensor node, a feed sensor node, or an effluent sensor node. Such displays may further include a ranking or a warning condition associated with the sensor nodes. For example, the warning condition may indicate the sensor data is not being received or the sensor data is outside of a selected range. In embodiments, the server is further configured (by the program instructions) to learn over time using a machine learning algorithm and the like for identifying the preventative failure condition. The server may also be configured (by the program instructions) to apply a machine learning algorithm to the received sensor data to identify the preventative failure conditions. The machine learning algorithm may also be configured to eliminate false positives. The selected context may also be limited to specific sensor nodes present in the system. The display may then include readings and/or a current condition of the selected sensor node The sensor system 100 may include one or more operational devices which may be manually and/or automatically adjusted by the one or more processors 110 in response to data collected by the system 100. The one or more operational devices may include any operation or application devices known in the art including, but not limited to, irrigation equipment/devices, spraying devices, sprinklers, drip lines, fans, heaters, drying equipment, fertilization equipment, chemical distribution equipment, pumps, valves, and the like. For instance, the operational devices may be communicatively coupled to the server 108 using any technique known in the art. The one or more processors 110 may be configured to automatically adjust one or more characteristics of the operational devices based on data collected by system 100. The sensor system may also automate control of one or more animal facility controls systems. Such automated control may occur by a close-loop control scheme, or the like. The animal facility control systems may include, but are not limited to, feed systems (e.g., motors), water systems (e.g., animal waterers), HVAC systems (e.g., fans, heaters, and the like), medication systems (e.g., feed and/or water systems for conveyance), and the like. Such animal facility controls systems may then be remotely turned on or off by the sensor system. The animal facility controls systems may also be controlled in situ by one or more humans that are informed of the status of the animal facility control systems by the user interface. Such automated systems may utilize edge or cloud-connected data processing systems for analysis and recommendations. The automated systems may also utilize one or more cloud connected systems for pairing to provide input for automatic or user control.

Figure 1C:
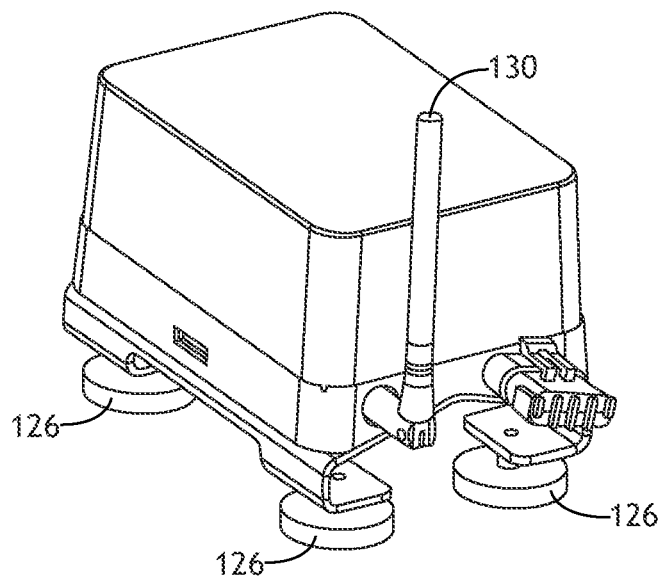
FIGS. 1C-1D illustrates a perspective view of a gateway of a sensor system, in accordance with one or more embodiments of the present disclosure.
Figure 1D:
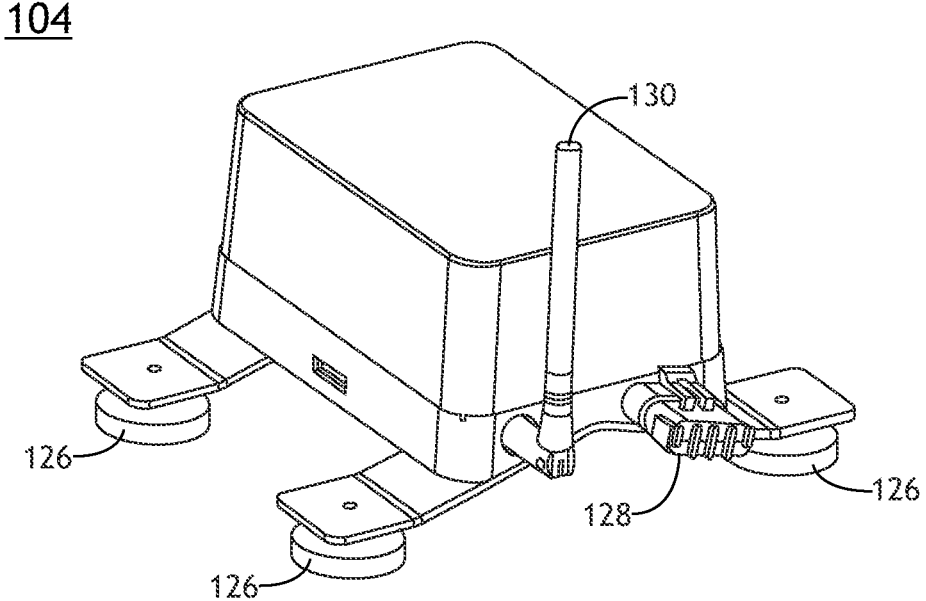

FIGS. 1C-1D illustrates a perspective view of the gateway 104, in accordance with one or more embodiments of the present disclosure. In embodiments, the gateway 104 is configured to mount by a tool-less installation. For example, the gateway 104 may include one or more magnets 126. As depicted, the gateway 104 may include four of the magnets 126. Such magnets may provide for surface mounting the gateway 104 to a ferromagnetic material. The gateway 104 may further include one or more connectors 128. The connector 128 may include any connector known in the art. Such connector 128 may provide a power input from a solar panel, a line power, or the like. The gateway 104 may further include one or more antenna 128 for connecting to the network 106.

Figure 1E:
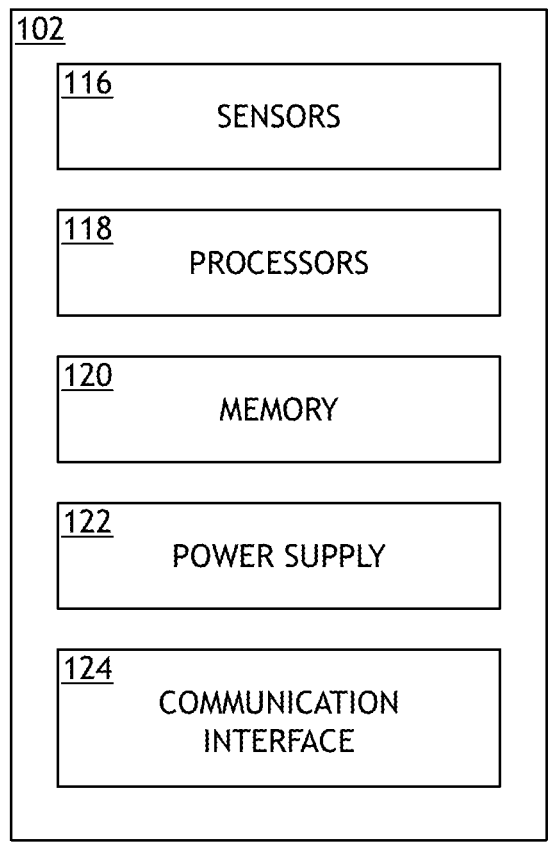
FIG. 1E illustrates a simplified block diagram of a sensor node of a sensor system, in accordance with one or more embodiments of the present disclosure.

FIG. 1E illustrates a simplified block diagram of the sensor nodes 102, in accordance with one or more embodiments of the present disclosure. The sensor nodes 102 may include one or more components, such as, but not limited to, a housing, one or more sensors 116, a processor 118, a memory 120, a power supply 122, or a communication interface 124. The sensors 116 of the sensor node 102 may include, but are not limited to, one or more sensors for generating data for the feed weight sensor node 208, pressure plate sensor node 210, feed level sensor node 212, feed tube sensor node 214, motor vibration sensor node 216, water flow sensor node 304, water level float sensor node 310, environmental sensor node 402, livestock counter sensor node 504, gate sensor node 506, imaging sensor node 602, microphone sensor node 604, syringe sensor node 702, water flow sensor node 704, feed flow sensor node 706, effluent float sensor node 804, effluent level sensor node 806, power sensor node 902, ear tag sensor node 1002, and the like.

In embodiments, the one or more processors 118 are configured to receive data collected by the one or more sensors 116 and store time-stamped data in memory 120. In embodiments, the one or more processors 118 may be configured to execute a set of program instructions stored in memory 120, the set of program instructions configured to cause the one or more processors 118 to carry out one or more steps of the present disclosure. In this regard, the sensor nodes 102 may include edge processing capabilities.

In embodiments, the sensor nodes 102 includes a power supply 122. It is noted herein that the power supply 122 may include any power supply known in the art including, but not limited to, one or more batteries, one or more battery packs, one or more energy-storing capacitors, and the like. It is contemplated herein that any power supply which is capable of long-lasting storage capabilities may be used in sensor nodes 102, unless noted otherwise herein. In an additional and/or alternative embodiment, it is contemplated herein that sensor nodes 102 may be configured to harvest electrical energy from its environment (e.g., by a solar panel or the like). The power supply may also include a line power or the like.

In embodiments, the sensor nodes 102 include a communication interface 124. The communication interface 124 may include any communication interface known in the art. By the communication interface 124 the sensor nodes 102 may be configured to communicatively couple with the network 106 (e.g., directly by a cellular connection and the like, indirectly by way a LoRa connection with the gateway 104 and the like).

Ease of installation is of unique importance to the adoption of technology in the agriculture space. It is contemplated that the sensor node 102 may be installed in a number of suitable manners. For example, the sensor node 102 may include magnets, zip ties, or adhesives to install quickly to metal or plastic structures. Other quick install options exist including adhesives (e.g., double-sided tape), zip ties, quick clamps and the like. In this regard, the equipment may be installed within a few seconds. Once installed, the sensor node 102 may then be configured to communicate with the gateway 104 and/or the network 106.

Figure 2A:
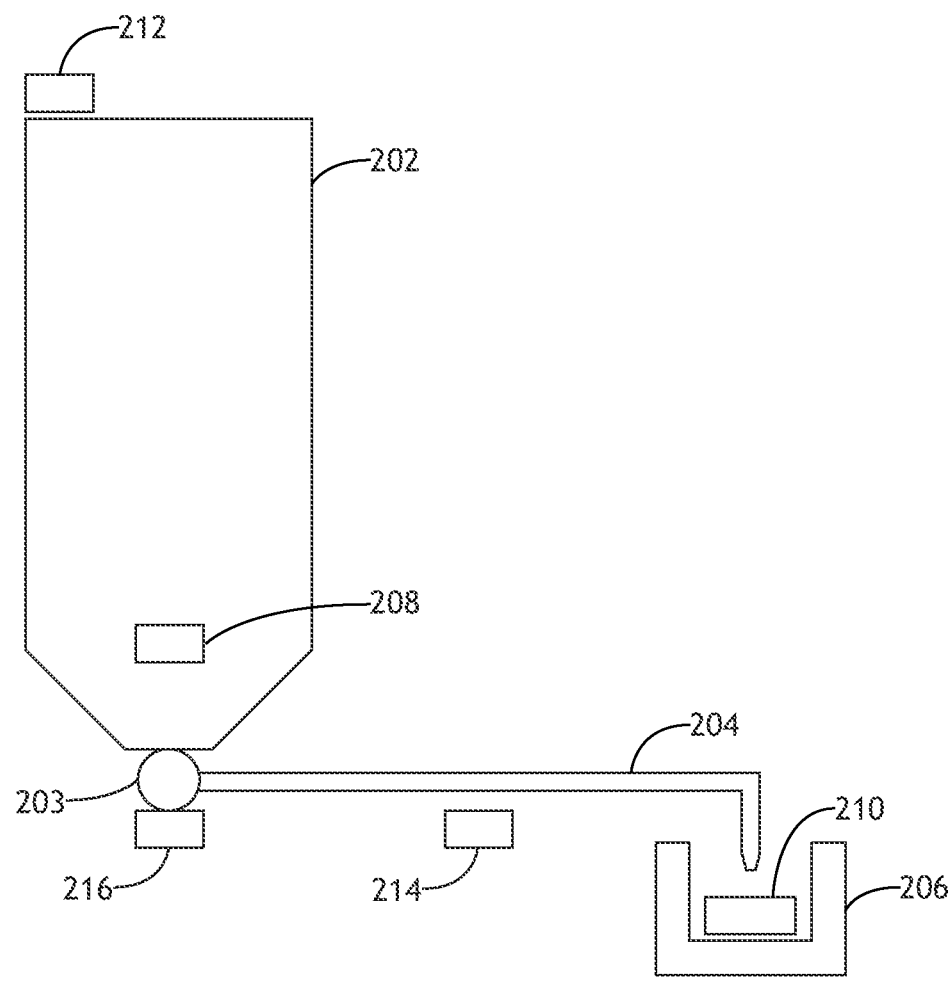
FIG. 2A illustrates a simplified plan view of a sensor system including a feed bin and one or more sensor nodes, in accordance with one or more embodiments of the present disclosure.

FIG. 2A illustrates a simplified side view of the sensor system 100, in accordance with one or more embodiments of the present disclosure. Feed may be transferred from a feed bin 202 to a feeder 206 through one or more feed tubes 204. The feed tubes 204 may provide a pathway for the feed from the feed bin 202. The feed bins 202 are commonly located outside of a livestock building. The feeder 206 is commonly located inside of the livestock building. In some instances, the feed bin 202 automatically disperses feed to the feeder 206 by an automatic animal feeding system. When the feed bin is empty livestock are not eating and not gaining weight. The livestock may also tend to become irritable and might fight with other livestock. In embodiments, the sensor system 100 may include a feed weight sensor node 208 to measure a feed weight in the of the feed bin 202. In embodiments, the sensor system 100 may include a pressure plate sensor node 210 within the feeder 206 that opens a circuit when no feed is pushing against the pressure plate sensor node 210. Thus, feed may be automatically distributed from the feed bins 202 to the feeders 206.

Figure 2B:
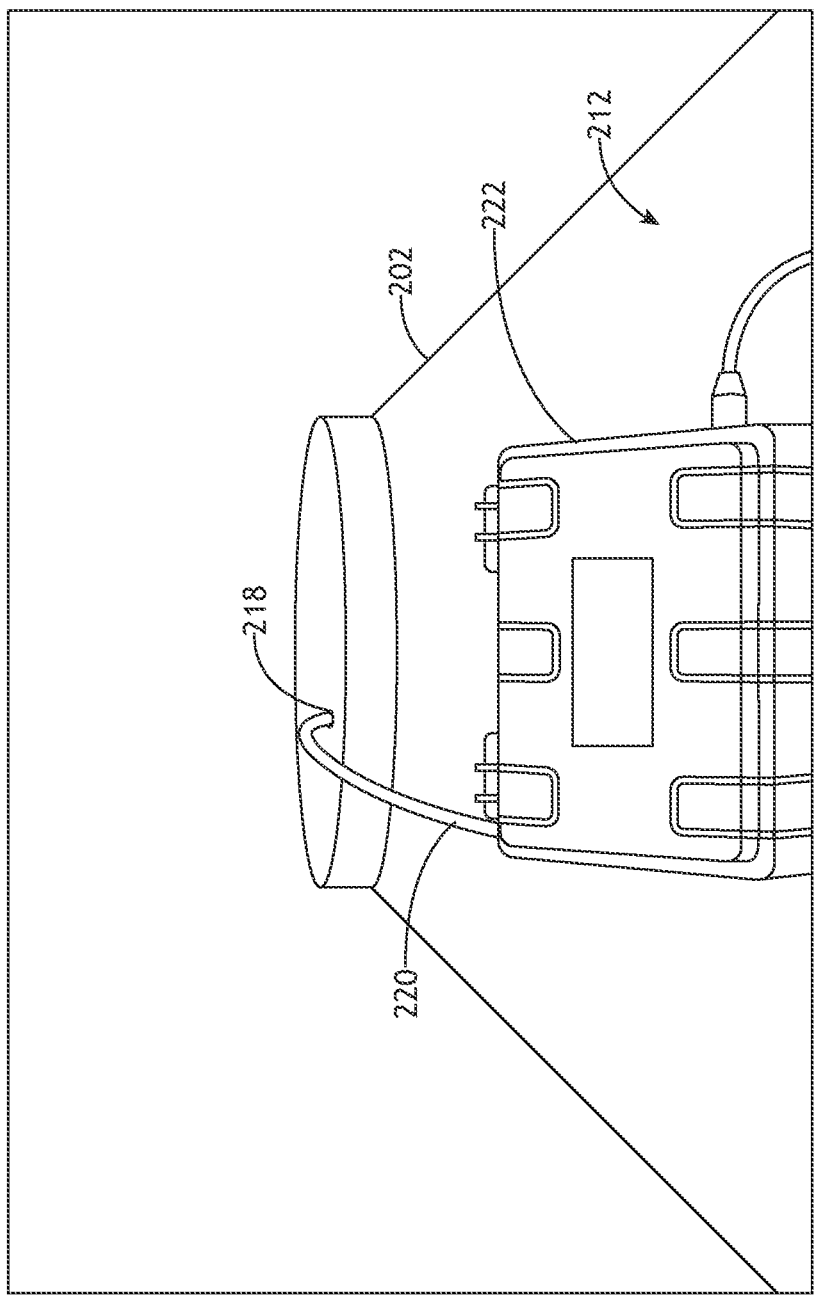
FIG. 2B illustrates a perspective view of a feed bin and a feed bin level sensor of a sensor system, in accordance with one or more embodiments of the present disclosure.

In embodiments, the sensor system 100 includes a feed level sensor node 212. FIG. 2B further illustrates the feed level sensor node 212. The feed level sensor node 212 may include a level sensor 218 hung over the lip of the feed bin 202. The feed level sensor node 212 may include a cable 220 that connects the level sensor 218 to a housing 222. The housing 222 may include a mounting structure for mounting the housing 222 to the feed bin 202. The feed level sensor node 212 may include any suitable power source described previously herein, such as, but not limited to, batteries, a solar panel (in combination with rechargeable batteries), line power, and the like. The feed level sensor node 212 may be mounted to the feed bin 202 in any suitable manner, such as, but not limited to, by a magnet (e.g., where the feed bin 202 is a ferromagnetic material), by peel and stick adhesive, and the like. Due to the myriad of tank types and shapes in the industry, a universal mounting mechanism enables quick assembly with common bracketry.

In embodiments, the sensor system 100 includes one or more of a feed tube vibration sensor node 214 or a motor vibration sensor node 216. The feed tube vibration sensor node 214 may be mounted to mounted to the feed tube 204 for measuring vibrations of the feed tube 204. The motor vibration sensor node 216 may be mounted to mounted to a motor 203 of the feed bin 202 for measuring vibrations of the motor 203. The motor 203 may vibrate when conveying feed from the feed bin by the feed tube. The feed tube vibration sensor node 214 and/or the motor vibration sensor node 216 may operate using any suitable power source, such as, but not limited to, internal batteries, solar, line power, and the like. The feed tube vibration sensor node 214 and/or the motor vibration sensor node 216 can be quickly installed on the feed tube via peel and stick adhesive, using zip ties, clamps, or other installation techniques. The feed tube vibration sensor node 214 and/or the motor vibration sensor node 216 may measure the vibrations in any suitable manner, such as, but not limited to, an accelerometer or the like. In embodiments, feed tube vibration sensor node 214 and/or the motor vibration sensor node 216 may collect vibration data for monitoring the feed bin. The vibration data may then be converted into multiple states of operation or failure such as running full, running empty, not running and outage. Run-times of the states may also be accumulated to allow the barn or site manager to be able to see how long the feed bin 202 has been in a particular state. The feed tube vibration sensor node 214 and/or the motor vibration sensor node 216 may determine the states (e.g., via edge-processing) and/or the vibration data may be transmitted to the server 108 for cloud-processing. The feed tube vibration sensor node 214 and/or the motor vibration sensor node 216 can transmit this data to the server 108, either wirelessly (such as via cellular, Bluetooth or wirelessly via a separate wireless gateway such as LoRa), via a wired connection (such as an ethernet cable), or the like. In embodiments, one or more of the feed tube vibration sensor node 214 or the motor vibration sensor node 216 is configured to edge process the vibration data, determine the feed bin is bridged or empty, and transmit the sensor data in response to detecting the feed bin is bridged or empty. In some instances, a data bandwidth may be conserved by edge processing before transmitting the vibration data. The feed tube vibration sensor node 214 may detect a vibration of the feed tube, which may then be used to tell if the feed bin is running full or empty. An empty vibration reading means that the feed bin has either run out of feed or the feed has bridged. Further combination of the vibration feed "outage detection" with actual feed bin level readings may improve a state detection for fool-proofing the system. In this regard, a determination may be made whether the feed bin is bridged or empty based on the addition of the feed level data.

Figure 2C:
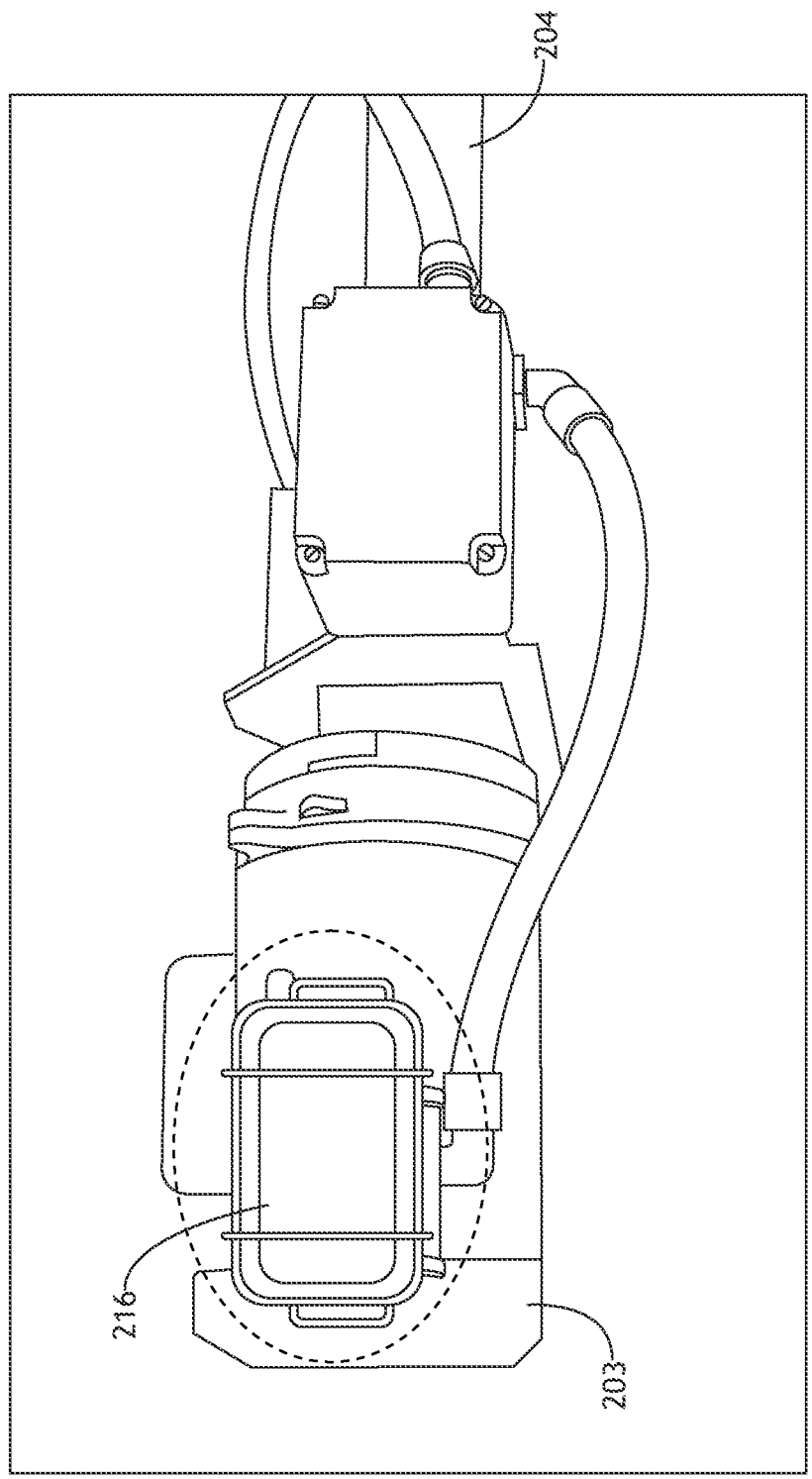
FIG. 2C illustrates a perspective view of a motor and a motor vibration sensor node of a sensor system, in accordance with one or more embodiments of the present disclosure.

FIG. 2C further illustrates the motor vibration sensor node 216, in accordance with one or more embodiments of the present disclosure. It is contemplated that the motor vibration sensor node 216 may be rapidly installed in less than five minutes. The motor vibration sensor node 216 may then sense vibrations of the motor 203. The motor vibration sensor node 216 may be provided with any suitable power source, such as, but not limited to a battery. The motor vibration sensor node 216 may include a memory for storing the vibration data.

Figure 2D:
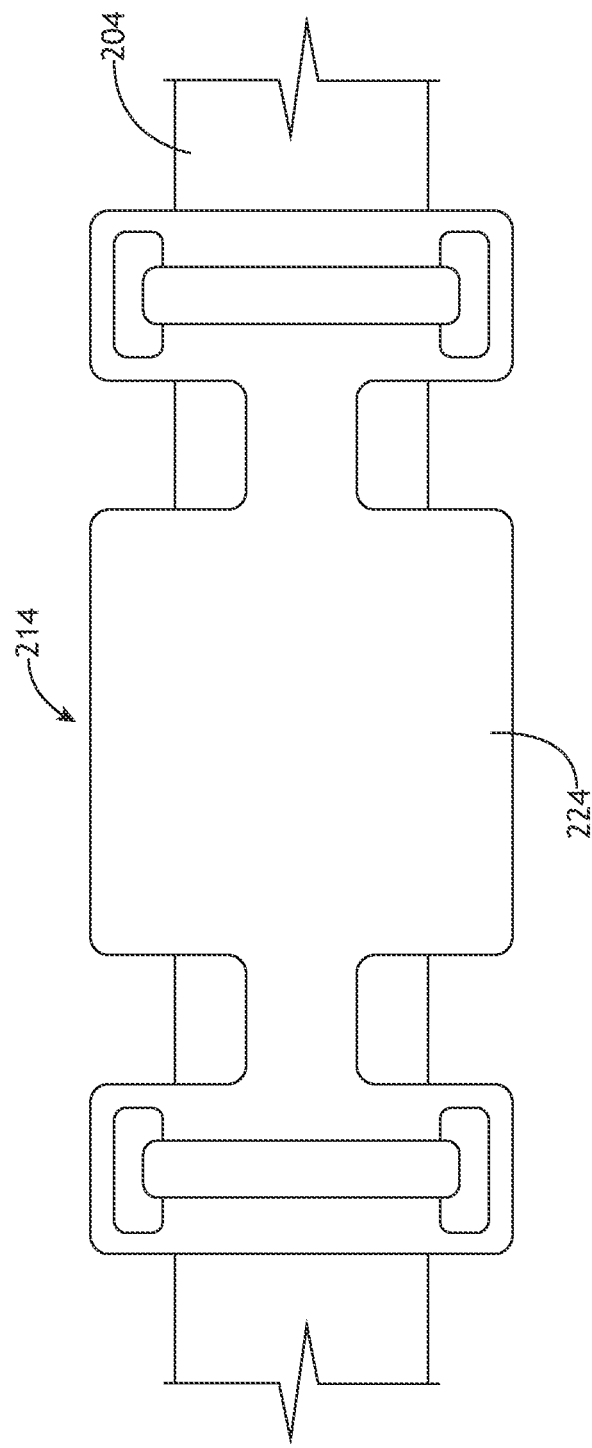
FIGS. 2D-2E illustrate a perspective view of a feed tube and a feed tube vibration sensor of a sensor system, in accordance with one or more embodiments of the present disclosure.
Figure 2E:
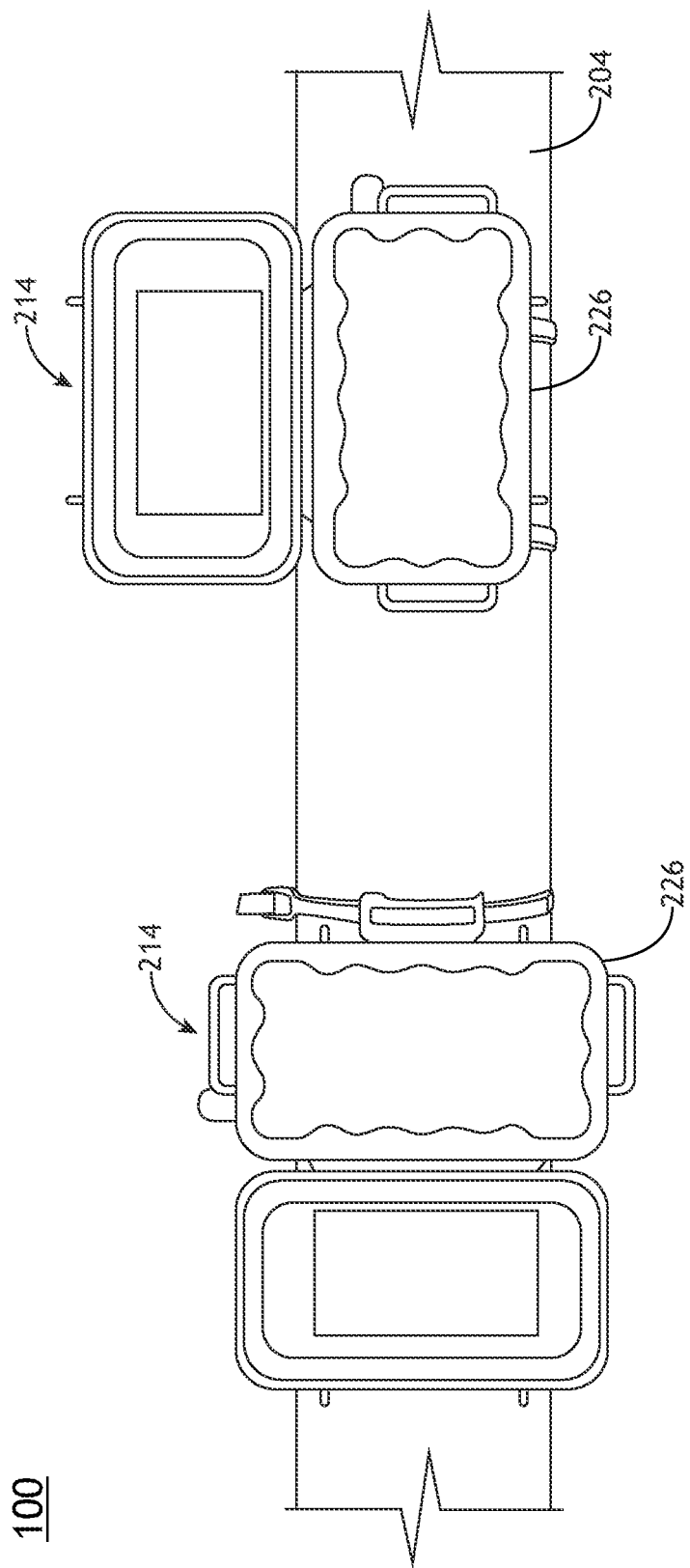

FIGS. 2D-2E further illustrate the feed tube vibration sensor node 214. It is contemplated that the feed tube vibration sensor node 214 may be rapidly installed in less than five minutes. For example, the feed tube vibration sensor node 214 may include a mounting bracket 224. The mounting bracket 224 may include one or more holes configured for zip-tying the mounting bracket 224 to the feed tube 204. It is further contemplated the mounting bracket 224 may be coupled to the feed tube by any suitable mounting mechanism, such as one or more of magnetic mounting, bolting, clamping, adhesive, and the like. A housing 226 of the feed tube vibration sensor node 214 may then be coupled to the mounting bracket 224. The housing 226 may house one or more electrical component of the feed tube vibration sensor node 214, such as, but not limited to, one or more sensors, processors, memory, power supplies, and/or communication interfaces. The feed tube vibration sensor node 214 may be coupled to the feed tube 204 in a number of orientations, such as, perpendicular or parallel to the feed tube 204.

Once vibration data has been collected, trends in the data can be detected and recommendations provided to managers. The trends may be detected and recommendations may be made by one or more data methods.

In embodiments, vibration data may be used to identify when the feed bin 202 may be bridged or that it is empty needing service. The vibration data may be analyzed to determine if the motor 203 and/or the feed tubes 204 continue to run. The motor 203 and/or the feed tubes 204 may continue to run when the feed bin 202 is empty or when feed is bridged against the walls of the feed bin 202 and cannot be delivered to one or more feeders.

In embodiments, the vibration data may be used to identify an inconsistent feed consumption pattern. The vibration data might show very consistent feed consumption patterns, which translates to the motor 203 and/or the feed tube 204 turning on consistently. The vibration data may be analyzed to determine that upon the motor 203 turning on at roughly consistently times, alerts can be sent if the motor 203 starts not turning on at those same consistent patterns. Inconsistent or reduced number of motor 203 starts and/or the feed tube 204 starts might translate into animals being sick and not eating or not eating as much, feeders being plugged, and the like.

In embodiments, the motor 203 and/or feed tube 204 vibration data is cross-referenced with the feed bin 202 level data. By such cross-referencing, the bridging status and the feed consumption patterns may be more accurately determined. For example, if the motor 203 and/or feed tube 204 continues to run, feed is no longer filling the feeders 206, but it may be unclear if the feed bin 202 is out of feed or merely bridged. If the motor 203 is running and the feed bin 202 is not empty, a determination may be made that the feed has become bridged inside the feed bin and that someone needs to be dispatched to solve this problem. Similarly, a device could be remotely activated to shake the bin for dislodging the bridged feed. This same idea can be applied to other bins such as those housing fluidized solids such as plastic pellets, whey, chemicals, saw dust, and the like.

The sensor system 100 may then use feed level, feed motor vibration data and/or feed tube vibration data to identify when a bin may be empty or how much feed was used. For example, the sensor system may identify such traits of the feed by linear regression. By observing trends and using the linear regression method, a simple estimation of a date when a bin may be empty can be forecasted. The forecast date may then be used to automatically order feed delivery and/or for displaying the feed outage prediction to the user interface. To improve accuracy, other data can be used such as a fill date or a fill amount that comes from a separate system or entered by a user. By way of another example, the sensor system may identify such traits by a machine learning algorithm. Knowing that barns perform differently and that consumption rates vary based on many variables, data may be gathered over multiple turns on a specific barn type even down to that exact barn, for the purpose of projecting how much feed has been used or when a bin may be empty.

In embodiments, the sensor system 100 may use feed motor vibration data and/or feed tube vibration data to identify when a feed source has been switched or changed between one or more of the feed bins. Two or more feed bins may share a common feed tube. A manual or automatic switch can be used to change the feed source. By observing the acceleration of the switch or slide when a switch or slide moves, the algorithm on the hardware can understand that a change has been made to select a new feed source.

In embodiments, feed deliveries are correlated to the feed bins. For large livestock operations, feed deliveries tend to occur each day because animals must have access to feed every day, not just during standard business hours. As a result, caregivers and feed truck drivers must work over the weekends. Modern swine and poultry buildings typically utilize one or more feed storage bins to hold the ground feed prior to being conveyed into each building's animals' feeders. In some cases, the delivery drivers may not check to ensure the correct feed is being delivered to the associated feed bin. Ensuring that the correct feed is delivered to the associated bin is important because different feed rations are used for different animal growth stages. At times, medication or growth promotants are added to feed, such that the designated animals are fed special feed for medical reasons or for reasons of stopping the feeding of such medicated feeds for a period prior to animal slaughter. In embodiments, one or more sensor nodes may provide a warning to the truck driver and even to lock out the truck feed conveyance system prior to unloading the wrong feed in the wrong bin. The sensor nodes may virtually link with proximity data from one or more devices. For example, the sensor nodes may be located on or near each feed bin. The sensor node may then act as an identifier, specifying a bin number and/or name. The sensor node may be a beacon which emits a unique identifier (e.g., an identification signal) or a more complex device that might have one or more other functions (i.e., measures feed level at the bin). In some instances, the feed truck delivers the feed by a stinger (e.g., a spout that funnels conveyed feed into the bin). The stinger or some other portion of the feed truck may also include a sensor node. Such sensor node may also emit a unique identifier. In embodiments, the feed truck may include a compartment fitted with a feed level sensing apparatus to ensure that the assigned "planned" feed ration is being conveyed to the correct feed bin. The truck "stinger" may then come in physical proximity to the feed bin. Data may then be compared between the planned feed for that bin and the feed in the feed truck storage compartment. In the case that the planned feed for a specific feed bin matches the feed in the truck compartment, no alerts are issued to the driver and the feed is allowed to be conveyed to the bin. In the case that the planned feed for the feed bin does not match that in the truck compartment, the driver is alerted and a lock-out on the feed truck conveyance system is activated, preventing the wrong feed from being unloaded. Since it is typical for feed bins to be clustered near one another at a given CAFO building, proximity associations would need to be within approximately 5 feet to be useful for identifying the specific feed bin.

In the case that different rations are not being tracked separately for one or more bins per bin grouping per barn, the GPS accuracy would not need to be nearly as accurate. Standard GPS WAS accuracy (+/−15 ft) may be sufficient to differentiate between feed bins located in different buildings or otherwise sufficiently far apart. In this example, the sensor nodes may be mounted on or near each individual feed bin has geospatial data assigned to it, either because the sensor node has GPS on-board, or a geo-spatial relationship has been assigned to it in software. In this example, the sensor node mounted on the feed truck "stinger" has geospatial data assigned to it via on-board GPS because of the mobile nature of the truck.

The ability to track the feed delivered to the feed bin may also be advantageous in confirming feed deliveries, driver, time of day, ration, confirming a delivery time, or a type of feed delivered, a delivery of a feed ration to at least one of a bin, a room, or a barn, and the like. Feed delivery tickets can also be generated or tracked using such information, ensuring better traceability. The effectiveness and efficiency of each feed delivery driver might be scored based on the recorded data for the feed deliveries. The delivery driver scores may also be benchmarked to other feed delivery drivers. In some instances, the nodes may be particularly advantageous in the implementation of autonomous feed trucks. In that case, the sensor nodes may ensure the delivered feed matches the planned feed.

Correlating the feed deliveries to specific feed bins can also be applied to other livestock species such as cattle in feedlot applications, dairy cattle operations, horses, and the like. For example, the sensor nodes which generate proximity sensing data may be used when delivering forage or other grain-based feeds at cattle feed bunks. As the feed truck spout comes in close physical proximity to one or more feed bunk (translating to a specific animal pen), that data is compared between the planned feed for that bunk and the feed in the feed truck. In the case that the planned feed matches the feed in the feed truck, no alerts are issued to the driver and the feed is allowed to be conveyed to the bunk. In the case that the planned feed does not match that in the truck, the driver is alerted and a lock-out on the feed truck conveyance system could be activated, preventing the wrong feed from being unloaded. Since it is typical for a long length of feed bunks to be clustered near one another at a given feedlot, proximity associations would need to be within a distance of the start of each section of feed bunk, which translate to a specific animal pen.

Figure 3A:
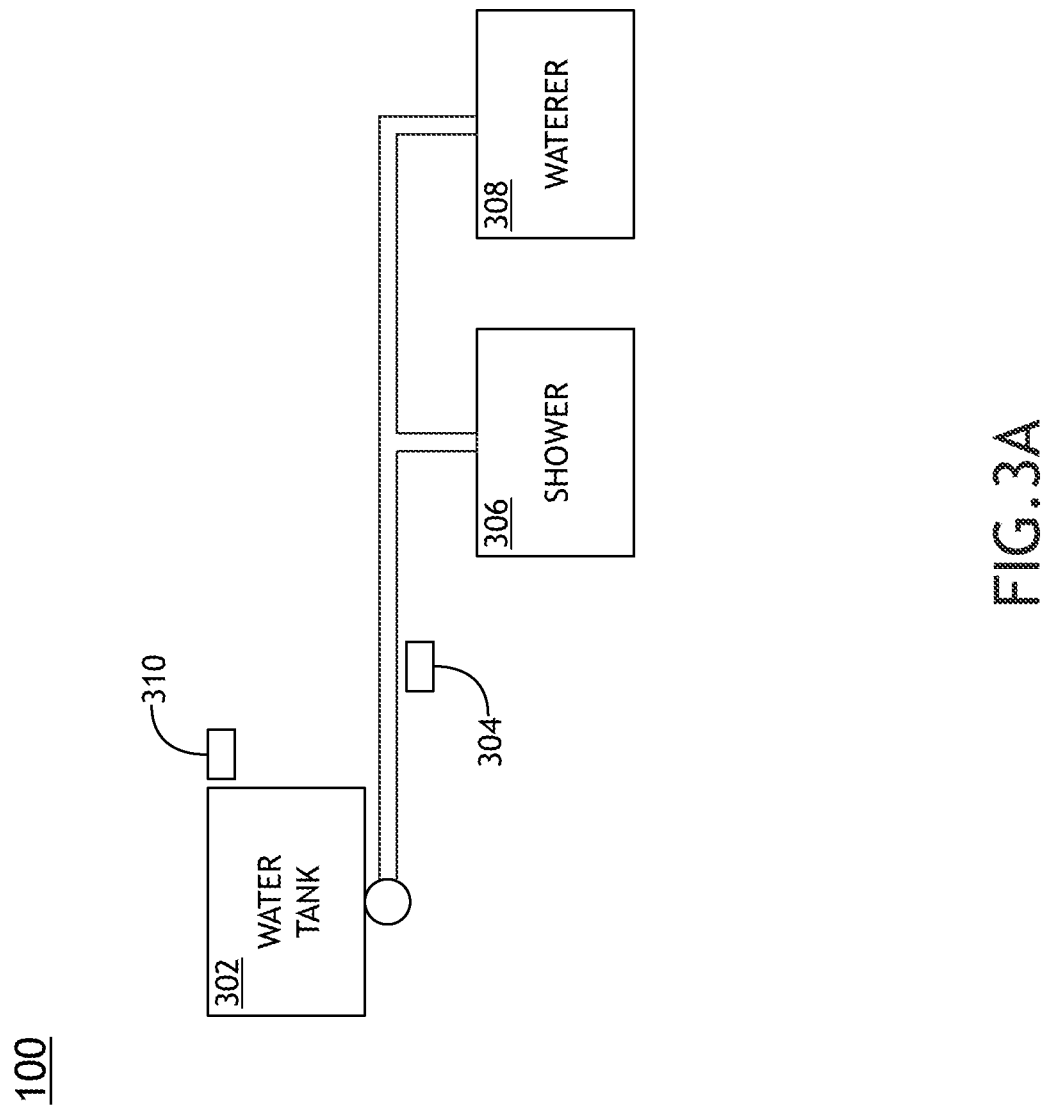
FIG. 3A illustrates a simplified plan view of a sensor system including a water flow sensor node and a water level float sensor node, in accordance with one or more embodiments of the present disclosure.

FIG. 3A illustrates a simplified block diagram of the sensor system 100, in accordance with one or more embodiments of the present disclosure. The sensor system 100 may include one or more of a water tank 302, a water flow sensor node 304, a shower 306, or a waterer 308. The water flow sensor node 304 may detect a flow rate of the water within the water line 303 by any suitable means. For example, the water flow sensor node 304 may detect the flow of the water by a vibration sensor. In embodiments, the water flow sensor node 304 detects water flow rate from the water tank 302 to one or more of the shower 306 or the waterer 308. Although the sensor system 100 is described as including the water tank 302, it is further contemplated that the various sensor nodes may be used in one or more of the water tank, pond, pit, lagoon, and the like. Although the sensor system 100 has been described as including a water tank 302, this is not intended as a limitation on the present disclosure. The water flow sensor node 304 may further detect a flow rate of water to one or more of a nipple waterer or a pan.

In embodiments, the sensor system 100 is configured to receive water usage data (e.g., flow rate) and use the water usage data to identify on-site staff. When staff come on-site, they may shower into a site. By observing water flow, an algorithm can identify a water usage profile identifying a shower in/shower out event. This is important for site managers so that they can ensure that their workers are "showering in" or "showering out" to mitigate biosecurity issues inside a livestock barn or series of barns.

In embodiments, the sensor system 100 is configured to use the water usage data to identify growth cycle and turn data. When a new group of livestock enters a building, the water usage changes in a way that can identify the end of a cycle or the beginning of a new growth cycle. This information, automatically collected, is interesting because humans are not always consistent in recording dates in a respective livestock management system. This measured data may be highly accurate and may also be automatically loaded into a livestock management system. The water usage data may also be used to determine one or more of a health issue (animals drinking less water) or to predict when barns are being soaked prior to power washing (after animals have been moved). Growth curves or models may be applied to groups of similar livestock. The server may be curated such models by group or the like. Sensor data may be used to identify if the groups of animals are below, on, or above expected growth trajectories. As more sensor data is collected, the algorithms may provide earlier indication of behavior indicative of falling or rising performance. This earlier identification may provide lead time and insights into actions that could be taken to improve the growth trajectories of the livestock groups.

In embodiments, the sensor system 100 is configured to use water usage data to identify animal stage of growth. If livestock is delivered to a CAFO, the growth stage of the animals may be identified either by understanding the number, weight, and type (even hybrid), then the data shows where that animal is at in its growth stage. With sufficient data and in conjunction with feed run time and feed usage information, the sensor system may provide insight into weight estimations and the barn's growth curve as compared to data from other barns monitored by the sensor nodes. In this regard, an identification of one or more of the weight or health the livestock or the livestock pen may be made based on the flow rate and one or more of a number of livestock, a type of the livestock, a breed of the livestock, or a feed usage. The weight estimations may further be determined based on camera-based animal activity data. Such camera-based animal activity data may determined by applying an image recognition model to camera data from a camera, imaging sensor node, lidar node, radar node, or the like.

In embodiments, the sensor system 100 is configured to use water usage data to identify one or more failure modes. The water lines 303 may leak or there may be total line failure that can be identified by an abnormal trend or spike in water usage. The ability to identify failure modes of the water lines 303 may be advantageous, due to the animals inside such a building being completely dependent on humans to make sure that their water consumption needs are met.

In embodiments, the sensor system 100 is configured to use water usage data to identify sickness. By observing trends and understanding the animal's stage of growth, the sensor system may use an algorithm using data from collected data to identify an illness starting and passing through a CAFO.

In embodiments, the sensor system 100 is configured to use water tank level and/or temperature to remotely and proactively identify problems with livestock. A situation may exist in the livestock industry where holding tanks exist in rural areas to provide animals such as cattle, horses, and the like with water. Personnel may visit such tanks on a relatively frequent basis, such as once per day, to ensure the tanks contain water, especially in the summer months, or are not frozen in cold months. Either way, animals' lives are at risk if animals are not able to drink water from such water holding tanks. The ability to remotely view the water tank level and/or temperature may thus reduce and eventually eliminate people from wasting their time checking on these remote water tanks.

In embodiments, the water level float sensor node 310 includes a buoy that floats in the water inside the holding tank. Inside the sealed buoy would include electronics equipment including a circuit board, electrical power storage equipment such as batteries, wireless communications equipment such as cellular, Bluetooth, LoRa, SigFox, Wi-Fi, LOE satellite, or other similar method of wirelessly communicating with the cloud. Sensors that would interface with one or more circuit boards include water temperature sensor, ambient temperature sensor, tilt sensor (the angle of the buoy can be used to identify when the tank is getting empty—when the buoy tilts, the tank is getting empty). To achieve fast device installation time, a customer may scan a QR or bar code on the float device to launch a web or app on a smart device which would enable the customer to enter site-specific information such as tank type, tank dimensions, liquid in tank, type of animals in pen, and the like. These site-specific data would be used to calculate tank liquid volume capacity and enable for alerts to be most easily set up. A user may activate batteries within a sealed device that uses a magnetic reed switch. A user just has to remove an external magnet from the device packaging and the internal batteries power on and the device becomes live. The float sensor may then be thrown into the tank and operation be simple. The battery pack may be packaged in the lower part of the device to act as weighting to ensure that the buoy always floats in a certain vertical orientation. The communications equipment for the float sensor may be positioned in the upper portion of the float device to enable unclouded access to the sky for GPS and satellite communications as well as getting above the sides of the tank to enable wireless communication such as cellular or LoRa, Sigfox, Wi-Fi, and the like, especially for steel tanks (create a faraday cage that make it difficult for data to be transferred outside of the tank via wireless communications). The battery pack may include a combination of primary and rechargeable batteries to achieve a long operational life for the device. The primary battery pack is good at holding a charge for a long period of time, even in cold or hot temperatures. The primary batteries trickle discharge into rechargeable batteries as programmed and under the right temperatures. Rechargeable batteries are good at discharging faster and can be better used for charging electronics components such as super capacitors. With this combination of primary cell batteries, rechargeable batteries, and super capacitors, many combinations of capabilities can be affected on the device. The float sensor may thus provide alerts for freeze events (water is frozen or is starting to freeze), low water levels (well is not working, line is broken, hole in tank), and the like.

In embodiments, the water level float sensor node 310 includes a wireless communication interface within or near the self-contained float unit that may be used to communicate to and from technology on or inside animals (tags, implants, bolas). The ability to communicate with technology from the animals may be used identify which animals are coming to drink. Furthermore, the data regarding which animals are coming to drink may be logged. An alert may be generated when animals do not come to drink in a given period, signifying a potential health issue. By comparing the amount of time an animal is close to the tank, the frequency of times near the tank (drink events), and the ambient temperature, animal health might also be proactively identified. Additionally, biometric information might be identified via an on-animal or in-animal sensor and wirelessly communicated to the float device for the purpose of combining the data with other environmental data. For example, on a hot day, animals should come to drink more often than on cold days.

In embodiments, the water level float sensor node 310 is configured to process the data and make associations. For example, if ambient temperature is cold, animal internal temperature is high, the animal is likely sick. Another example is that no animals have come to drink over a certain period of time, so the animals have been moved into another pen or they have "gotten out" of their pen. Another example of an association might be that an animal has not come to drink in a given period of time. This might auto alert the responsible pen rider to investigate if something bad is wrong with that particular animal. In all of these cases, not all of the data would have to be sent to the cloud. In some instances, the "freeze" alert, animal "health alert", or "animal out" alert are sent to the server 108 for distribution to the caretaker while the other alerts are not sent, thereby reducing overload to the user interface.

In embodiments, the water level float sensor node 310 includes one or more of a circuit board, power, and communications equipment. The communications equipment may be wired or wirelessly coupled with one or more sensors including a water level sensor, water temperature sensor, ambient temperature sensor, or water flow sensor. These sensors may provide the information as if the sensors are all self-contained within a float type measurement and/or communication device. The float type sensor may include a number of power options, such as, batteries, solar, or line power to an electrical grid.

In embodiments, the water level float sensor node 310 may measure a vertical displacement for liquid in the tank by a comparison of GPS position to a known reference point via real time kinematic (RTK) GPS. Such a solution can be accomplished wirelessly where a single RTK base station can be leveraged for one or more tank buoys).

In embodiments, the water tank includes a heater such that the water tank may be considered a smart waterer. The sensor nodes may collect a number of data, such as, but not limited to, water flow, water temperature, float position (is water in tank), ambient temperature and a control element to automatically turn on the water heater upon the water temperature being colder than a preset value where the heater can start warming up prior to the tank freezing. It is also conceived to use such a device to wirelessly communicate with the smart devices on or inside animals for collection of applicable data. Water tanks or waterers may be used in the context of cattle. A thermostat may be used to keep the water within the tank or waterer from freezing in the winter. Other applications may be used for swine or poultry applications, such as a nipple used for swine applications or a pan used for poultry applications.

Figure 3B:
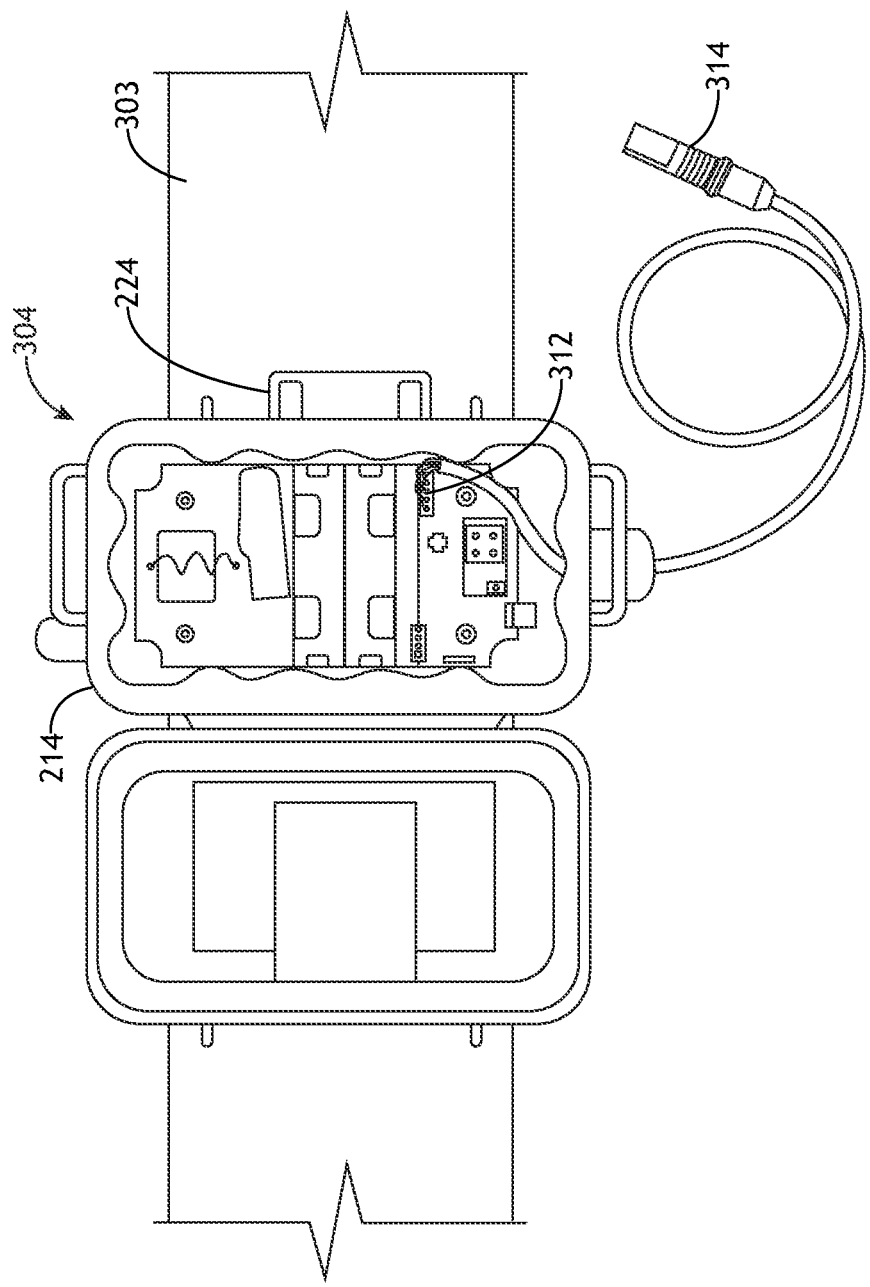
FIG. 3B illustrates a perspective view of a water line and a water flow sensor node of a sensor system, in accordance with one or more embodiments of the present disclosure.

FIG. 3B further illustrates a perspective view of the water flow sensor node 304, in accordance with one or more embodiments of the present disclosure. The water flow sensor node 304 may be similar to the feed tube sensor node 214. In this regard, the water flow sensor node 304 may include the mounting bracket 224, the housing 226, and the electrical components. The water flow sensor node 304 may include a main PCB and a sensor interface board with a connector 312 (e.g., a JST connector) for a probe 314. The probe 314 may include a temperature/humidity (TH) probe.

FIG. 4 illustrates a simplified block diagram of one or more sensor nodes 102 of the sensor system 100, in accordance with one or more embodiments of the present disclosure. In embodiments, the sensor nodes 102 may include an environmental sensor node 402. The environmental sensor node 402 may include one or more sensors to sample environmental data, such as, but not limited to, air quality, temperature, humidity, air pressure, air speed and the like. A user may define an acceptable band for each category of environmental data. In some cases, the environmental sensor node 402 edge processes the environmental data. When the environmental data falls outside of the acceptable band, the environmental sensor node 402 may trigger a log and/or provide a notification of the condition to a user interface. In this regard, the environmental sensor node 402 may provide notifications of conditions which may be detrimental to animal health and growth, ultimately giving the building manager the ability to adjust either manual or automatic equipment that can improve these conditions.

In embodiments, a ranking is provided based on the environmental conditions. The ranking may include ranking one or more of a site, a barn, or a room based on the environmental conditions. The data may then be used to organize and sort sites, barns and rooms to help the user to more quickly act and adjust conditions that will help with the growth and management of livestock. Farm managers need to manage more and more information and the only way this if feasible is if they have a way to only focus only on the information that matters. This information can be initially organized by what the user prioritizes and defines as acceptable. It is further contemplated that the system will be able to automatically create these rankings without additional user input, assuming that the user accepts the method of training that defines the rankings.

Figure 5:
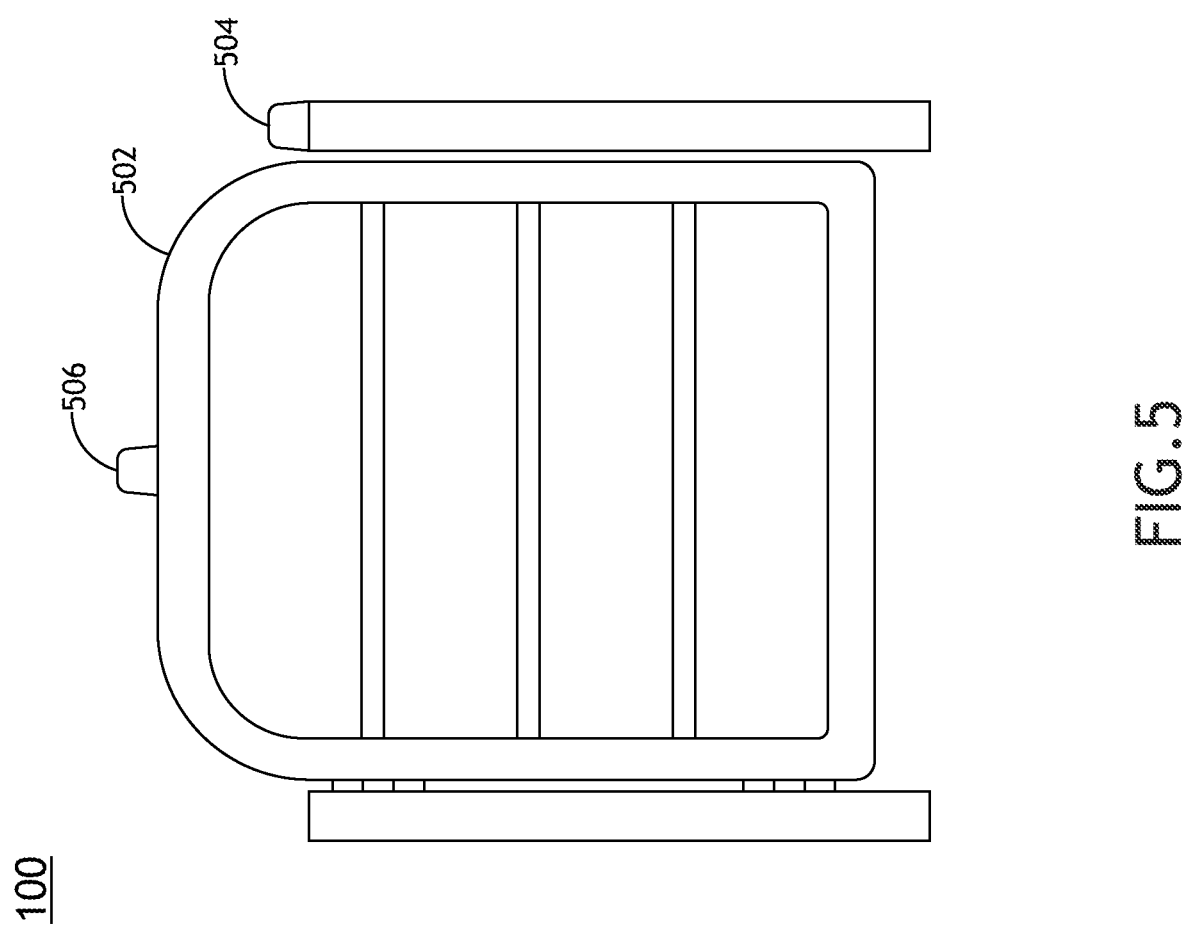
FIG. 5 illustrates a front view of a livestock chokepoint (gate) and one or more sensor nodes of a sensor system, in accordance with one or more embodiments of the present disclosure.

FIG. 5 illustrates a front view of the sensor system 100, in accordance with one or more embodiments of the present disclosure. In embodiments, the sensor system includes one or more of a chokepoint 502, a livestock counter sensor node 504, and a gate sensor node 506. It is very difficult to manually count living animals as the animals are typically moving. Even multiple counts by a human may result in different numbers. Animal counts are very important as animals enter a new site. As with any type of inventory, counting incoming inventory and outgoing inventory are important. In the case of incoming animals, it is important for the receiving site confirm the arrival on-site of a certain number of live animals. Any dead animals would not be charged to the receiving customer. In the case of outgoing animals, it is important for the outgoing site confirm the safe delivery of a certain number of live animals. Any dead animals would not be charged to the receiving customer. Incoming animals might be received at a packing plant, at a finishing site (swine), a background site (cattle), broiler site (poultry), and the like. Outgoing animals may leave a farrowing house or nursery (swine), a hatchery (poultry), a cattle operation, and the like.

In embodiments, the sensor system 100 may provide for automatic animal counting of incoming and/or outgoing animals. As mentioned above, automatic animal counting is useful because it is very difficult for humans to accurately count moving animals. The livestock counter sensor node 504 may continuously obtain images or video of animals moving through the chokepoint 502. The chokepoint 502 may be designed in such a way as to allow only one animal to pass at once, thus reducing counting errors. The chokepoint may include, but is not limited to, a gate or a weighing station. In order to minimize the complexity in counting animals as mixed in one or more pens, it is preferred to utilize the concept of one or more chokepoints 502 when performing counting sensing. A preferred form of creating chokepoints is to funnel animals down to single file via gates, scales, a door, a trailer compartment, a pen, animal milker, and the like. The livestock counter sensor node 504 may be mounted above or to the side of the chokepoint 502.

The livestock counter sensor node 504 may include one or more of a include one or more of a camera or a radar sensing system. The use of more than one camera would enable data from each of the cameras to be compared with one another to create data redundancy and improve accuracy. By utilizing one or more radar sensing systems, data that relates to animals moving through the chokepoint 502 may be continuously obtained. The chokepoint would be designed in such a way as to allow only one animal to pass at once, thus reducing counting errors. More than one radar sensing systems would enable data from each of the radar sensing systems to be compared with one another to create data redundancy and improve accuracy. CAFO applications are often harsh, with flies spotting lenses, ammonia corroding components, dust coating all surfaces, and the like. As a result, the radar sensing system may include an increased likelihood of correctly counting, as compared to the camera system, due to the lens of the camera becoming dirty and needing to be cleaned. In the case of dairy animals, the livestock counter sensor node 504 may be pointed at the side of the dairy cow while in an automatic feeder or while entering an automatic milker.

In embodiments, the automatic animal counting may be combined with an automatic identification of the animals. The livestock counter sensor node 504 may include a camera-based imaging system which is pointed at the side of a dairy cow station at specific chokepoints. The camera can be used to capture image data that can processed to individually identify animals based upon their color combinations. In this case, the position of the color combinations, such as a Holstein cow's spots, are used to individually identify the animal, acting as a so-called natural QR code. In embodiments, the gate is automatically opened in response to identifying the livestock animal. A specific animal number may be determined based upon facial recognition, active or passive ear tag, or by reading a tattoo on the animal. In the case of dairy animals, specific animal number can be read by recording the pattern on the animal.

In embodiments, the automatic animal counting may be used to update inventory in an enterprise resource planning (ERP) system with a count of the livestock animals passing through the chokepoint. The animal counting data may be combined to automatically populate animal inventory changes within the ERP system. The combination may occur by connecting to a server hosting the ERP system by one or more application programming interfaces (API). For example, one or more of the livestock counter sensor node 504, the gateway 104, or the server 108 may connect to the server hosting the ERP system. The ability to connect to the server hosting the ERP system may be advantageous in reducing the chance of errors associated with manually entering data or manually transferring data between systems.

In embodiments, the sensor system includes the gate sensor node 506. The gate sensor node 506 may provide one or more forms of access control. For example, the gate sensor node 506 may use vibration data to identify when a door or gate (e.g., the chokepoint 502) has been opened or closed. By observing the acceleration of the door or gate, an algorithm on the gate sensor node 506, the gateway 104, or the server 108 may detect and understand the state of the door or gate to be either open, closed or in transition based on vibration data, position data, or the like. The gate sensor node 506 may also be applicable outside of the CAFO environment, such as, for use in equipment in transporting livestock. By the use of such gate sensor node 506, the location of staff may also be identified. For example, the sensor system may include a plurality of doors. Each of the doors may include access to different rooms in a barn, such as, but not limited to, a shower area, an office, or other rooms. By time-stamping such door or gate events, a determination may be made as to when and how long staff spent in certain areas of a facility, building, or site. Such determination is important to determine if the staff spent enough time viewing certain parts of a livestock operation.

FIG. 6 illustrates a simplified black diagram of one or more components of the sensor system, in accordance with one or more embodiments of the present disclosure. The sensor system may include one or more components, such as, but not limited to, an imaging sensor node 602, a microphone sensor node 604, a shock device 606, or an air device 608. In embodiments, the sensor system may implement off-animal sensing and prediction. For example, the imaging sensor node 602 may capture images for automatically creating an animal condition score. Utilizing one or more cameras, a measurement may be determined for predefined characteristics of one or more animals. The ability to determine the measurements may be useful in determining health aspects of the animal. Such characteristics may include, but are not limited to, animal temperature, activity, aggression, back fat, leg geometry, ideal characteristics for reproduction, size of loin, overall weight, density, and the like. The condition score concept is one where a combination of variables may be combined in one or more ways to be able to compare animals in a standardized fashion against other animals. The display on the user interface may then be updated based on the imaging data. For example, the display may include one or more of an alert regarding an animal that is fighting with others, an alert regarding an animal that has not gotten up for a certain period of time, an alert regarding a dairy animal that is needing to be milked, an alert regarding an animal that is in heat, an alert regarding an animal that is thirsty, an alert regarding an animal that is hungry, an alert regarding an animal that is cold, and the like. The various sensor-based data can be supplemented with other sensor data to provide higher accuracy, especially learning over time from integrating the data with a smart scale.

In embodiments, the imaging sensor node 602 may capture images for identifying the animal back fat. Such imaging sensor node 602 may include one or more of a visual, hyperspectral cameras (e.g., radar, Lidar, microwave, etc.), or other non-invasive biomass-penetrating sensing technology that can be used to wirelessly measure body fat, such as backfat on pigs, cattle, sheep, and other animals. Data from the imaging sensor node 602 may then be used to predict and recommend certain operational behavior, such as, but not limited to, individual feeding volume, ration selection, and the like. The data may also be used as an input variable to an automatic sorting system for ensuring that animals are shipped for slaughter within one or more optimum body characteristics.

In embodiments, the imaging sensor node 602 may capture images associated with animal activity. Software may then be used to inform of changes in the animal activity. The imaging sensor node 602 may include one or more cameras. The cameras may continuously monitor animals in pens or other CAFO environments. Video data from the cameras may then be generated and analyzed. The video data may be analyzed by one or more of the imaging sensor node 602 (e.g., edge processing), the gateway 104, or the server 108. In embodiments, the analysis includes a camera-based depth perception of the animals. The sensor system may thus constantly monitor animals within the pen or other CAFO environment and determine inconsistencies with the animals based on such monitoring. For example, a number of animal tracking behaviors may be identified, such as, but not limited to, an animal has not gotten up to drink over a period that is not usual (e.g., a proactive alert for health issue), determining aggressive behavior (e.g., tail-biting in pigs), determining animals that are being chased or scared (e.g., a predator may be nearby), identifying early sick animal behavior (e.g., hanging heads in cattle, cattle off by itself, etc.), and the like.

In embodiments, the imaging sensor node 602 may capture images for generating farrowing or birthing predictions. The imaging sensor node 602 may continuously record mother animals during late pregnancy, either in a gestation crate, farrowing crate, a free pen (pigs), and the like. The video data may then be analyzed in near real time to detect predictive motherly behavior. The sensor system may detect a number of such predictive motherly behaviors, such as, but not limited to, rooting to make a nest, sow getting up and down frequently, sow pushing or straining, and the like. An alert may then be provided to the user interface 114. The alert may be set up to automatically inform caregivers to watch or assist with the birth to ensure the maximum number of healthy piglets. It is further contemplated that predictive motherly behaviors may be identified and predicted for a number of animals species at the start and/or end of birthing, such as, but not limited to, for pigs or cattle.

In embodiments, the imaging sensor node 602 may capture images for detecting when a mother animal is laying on a baby animal (e.g., sows laying on piglets). Mother sows in a farrowing crate are often lazy in getting up, even if they happen to accidentally lay on their piglets. It is often the case that the sow crushes or suffocates its babies when it lays down. The imaging sensor node 602 may record the farrowing environment, especially around the time of birth. Data from the imaging sensor node 602 may then be used to identify the scenario where the sow is laying on the piglet. The scenario may be identified by an image recognition algorithm, or the like.

In embodiments, the air device 608 may be configured to blast air at one or more of the sow or the piglets. The air device 608 may blast the air based on the proximity of the piglets to the sow, particularly when the sow is laying down. In this regard, the air device 608 may be used to scare the piglets away from a danger zone in proximity to the sow as the sow is laying down. The air device 608 may be housed in lower tubes of the farrowing crate or may be coupled to the farrowing crate as an aftermarket device. The tubes of the farrowing crate may act as a conduit for the pressurized air. The pressurized air may then be forced out of one or more nozzles for scaring the piglets.

In embodiments, the sensor system includes the microphone sensor node 604. The microphone sensor node 604 may capture audio data. The audio data from the microphone sensor node 604 may then be used to identify piglet squeals. Such piglet squeals may occur when the piglets are laid upon. The piglet squeals may be identified by any suitable method, such as, but not limited to, an audio-detection algorithm. One or more of the imaging sensor node 602, the gateway 104, or the server 108 may implement such audio-detection of the piglet squeals.

In embodiments, the sensor system includes the shock device 606. The shock device 606 may deploy an electric shock to the sow. The electric shock may then cause the sow to get up. For example, a piglet squeal may be detected from the audio generated by the microphone sensor node 604 and/or a trapped piglet may be detected from the video generated by the imaging sensor node 602. In response to detecting the trapped piglet, the shock device 606 may generate the electric shock to the sow. The sow may then stand up freeing the trapped piglet. It is further contemplated that a vibration device may be used to vibrate for agitating the sow in a similar manner to the shock device 606. One or more of the imaging sensor node 602, the microphone sensor node 604, or the server 108 may engage one or more of the vibration device, the shock device 606, or the air device 608.

In embodiments, the imaging sensor node 602 is configured to generate image data within a farrowing environment for generating a piglet sucking alert. The image data may be analyzed to identify piglets that are not finding the teat of the sow. The piglet sucking alert may then be generated in response to identifying that the piglet is not finding the teat. Generating the piglet sucking alert early enough after birth may allow caregivers to intervene, thereby improving the chance of survival of the piglet.

In embodiments, the imaging sensor node 602 is configured to generate image data for estrus detection. Estrus detection may include monitoring and recording the event of estrus. Estrus is characterized as the period of sexual receptivity for the female animal. Recording the estrus is advantageous when artificial insemination is the method of reproduction. In this regard, the cow is bread during estrus. The image data may be used to continuously record the animals' environment, especially around the time of birth. The image data may then be used to identify animal behavior associated with estrus. The identification may occur by any suitable means, such as, but not limited to, image recognition, or the like. Such continuous monitoring and automatic prediction information might be used to best time application of artificial insemination, thus ensuring the highest chance of pregnancy for animal production.

FIG. 7 illustrates a simplified block diagram of one or more of the sensor nodes 102 of the sensor system 100, in accordance with one or more embodiments of the present disclosure. The sensor system 100 may include one or more components for tracking medication, such as, but not limited to, a syringe sensor node 702, a water flow sensor node 704, or a feed flow sensor node 706. The ability to track medication may be advantageous in identifying buildings, air spaces, pens, or animals which have been provided medication. Often animals in a pen are communally medicated when one or more of the animals exhibits sick behaviors. By communally medicating such animals, a likelihood of widespread sickness in one or more of the pen, barn, or site may be reduced. However, communally medicating all animals in the pen, barn, or site may induce increased costs. Therefore, it may be desirable to only medicate animals that are exhibiting sick behaviors. In embodiments, one or more categories are tracked, such as, but not limited to, medication events, which animal has been medicated, where the animal was located when medicated, who administered the medication, the growth stage of the animal at the time of the medication event, and the like. In embodiments, medication may be provided to the animal by one or more of water usage to the pen, room, barn, or site, feed usage to the pen, room, barn, or site, or syringe usage. Different types of medication may be applied by the water usage, feed usage, or syringe usage. In embodiments, the sensor system provides tracking for one or more of the water usage, feed usage, or syringe usage.

In embodiments, the sensor system includes the syringe sensor node 702. The syringe sensor node 702 may identify one or more of a syringe usage, an amount of medication used, and animal on which the medication is used. The syringe sensor node 702 may be incorporated within a hand-operated syringe used to deliver the medication. The syringe sensor node 702 may include any suitable power source, such as, but not limited to, battery-power source. The syringe sensor node 702 may wirelessly communicate with other wireless sensors within range, including an animal identification tag (e.g., ear tag). Thus, the syringe sensor node 702 may detect which animal is being given the medication. The syringe sensor node 702 may also identify who administered the vaccine and which pen, room or building the animal is housed within by communicating with one or more other sensor nodes.

In embodiments, the sensor system includes the water flow sensor node 704. The water flow sensor node 704 may include a water flow meter or the like. The water flow sensor node 704 may also include a medicator rate data sensor or the like. The water flow sensor node 704 may also identify which animal is drinking from the water. Data from the water flow meter and the medicator rate data sensor may then be used to identify how much medication is provided to an animal. The data may also be combined with other data, such as, but not limited to, the physical location of the medication (e.g., room or pen), the person who administered the medication, and which pen, room, or building the animal is housed within.

In embodiments, the sensor system includes a feed flow sensor node 706. The feed flow sensor node 706 may be a component of a smart feed-based medication system. The feed flow sensor node 706 may generate data, such as, but not limited to, feed consumption rates as well as the feed ration and the amount of medication that has been applied to the feed. Such data may then be paired data such as the physical location of the medication such as a building room or pen, the person who set the medication level, and which pen, room or building the animal is housed within, and the like.

Figure 8:
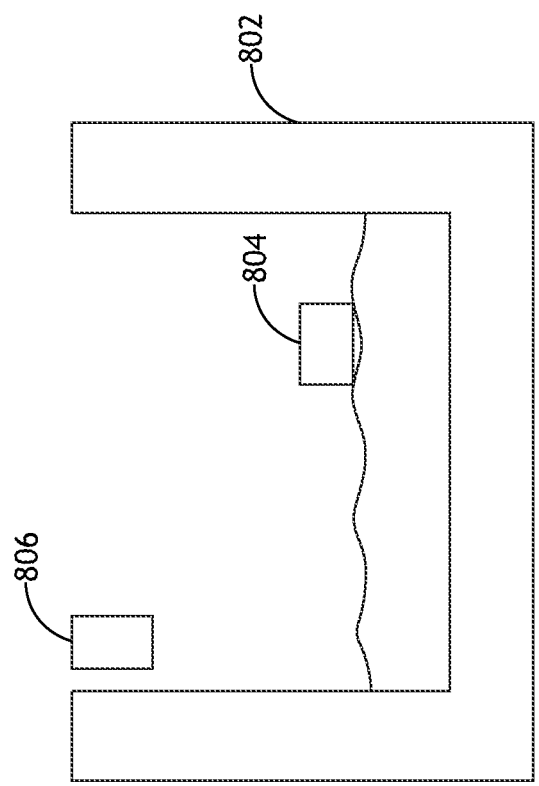
FIG. 8 illustrates a simplified side view of an effluent tank, pit, or reservoir and one or more sensor nodes of a sensor system, in accordance with one or more embodiments of the present disclosure.

FIG. 8 illustrates a side view of the sensor system 100, in accordance with one or more embodiments of the present disclosure. The sensor system may include one or more components for detecting and forecasting a full data of an effluent tank 802, such as, but not limited to, an effluent float sensor node 804 or an effluent level sensor node 806. Livestock operations typically utilize one or more lagoons, otherwise known as an outdoor storage structure or the effluent tank 802, for holding liquid manure. These structures typically hold a large amount of liquid effluent with solids typically sinking to the bottom. Although the sensor system 100 is described as including the effluent tank 802, this is not intended as a limitation of the present disclosure. The effluent float sensor node 804 and the effluent level sensor node 806 may also be useable in one or more of a effluent tank, pond, lagoon, pit, and the like.

By using statistics, a full date of the effluent tank may be forecast based on a current height of the effluent. For example, the full data may be forecast using linear regression. The linear regression may include observing trends and using one or more methods of linear regression to estimate a date when the effluent tank 802 is forecast to be full. By way of another example, a machine learning statistical method may be used to forecast the full date. Knowing that barns perform differently and that fill rates vary based on many variables, data may be gathered over multiple turns on a specific barn type even down to that exact barn to project when effluent levels will be full. Coupled with automated alerts, such forecasted alerts could be very useful for entities that keep such tanks full.

In embodiments, the sensor system includes the effluent float sensor node 804. The effluent float sensor node 804 may use a floating sensor assembly to measure a height or vertical displacement of the effluent, such as, but not limited to, by including a real time kinematic (RTK) global positioning system (GPS) sensor data. The effluent float sensor node 804 may also include one or more other sensors, such as, but not limited to, a nutrient sensor to measure nutrient constituents in the effluent. The effluent float sensor node 804 may provide a solution for measuring the changing level of these lagoon structures. The effluent float sensor node 804 may employ a floating sensor assembly that can communicate the vertical displacement of the liquid level. The sensor assembly can either be included inside or onto a buoy, attached to a floating assembly such as a rotomolded tank, or fixed to a structure that floats on the liquid level. Nutrient sensors may also be hung off such a floating sensor assembly or buoy with one or more nutrient sensors extending separately or via a single sensor string into the liquid. Thus, the effluent float sensor node 804 may measure the nutrient level of the effluent at one or more liquid depths by the nutrient sensor, in addition to providing remote monitoring of the liquid level by the float sensor. The ability to measure the nutrients and the corresponding height of the effluent may allow livestock operations to better plan for nutrient application of the effluent in a field. Furthermore, the nutrient information may provide livestock operations with empirical evidence of the nutrient content. Such information may be advantageous in more accurately setting effluent prices based on the nutrient levels in the effluent.

In embodiments, the sensor nodes are configured to measure effluent levels and/or foam levels in deep pit effluent applications. As livestock producers get larger and their operations become more spread out across counties and even states, it becomes increasingly important for them to view operational data across their sites. One of the operational and environmental items of need better visibility of pit levels under typical CAFO buildings, specifically remote visibility. In embodiments, the sensor system provides a reliable solution for remote monitoring of pit effluent and foam levels. Since there are typically short windows of time where this effluent can be applied as fertilizer to local fields (after spring thawing and before spring planting), it is typical for these deep pits to hold an entire year's worth of liquid manure. Due to the effluent being out of sight under the building, it is sometimes forgotten until the pit levels increase to overflowing. This might happen due to an unexpected water line break, poor planning, and the like. Either way, it is highly undesirable for pits to overflow since it is bad for the animals in the building and for the environment if the effluent makes its way outside the building, especially if a creek or waterway is nearby. Another challenge is that under certain circumstances, foam will build up on top of the liquid manure in the deep pit. This foam can build up and even seep up through the floor slats and make contact with the animals. This is highly undesirable for animal production managers as it has adverse effects for animal health. The highly corrosive and harsh environment provide a challenge in implementing effluent sensing of deep pit levels.

In embodiments, the sensor system includes an effluent level sensor node 806. The effluent level sensor node 806 may include a remote monitoring solution that utilizes a radar sensor to both measure the actual liquid manure level as well as foam. The radar sensor may be installed above the maximum effluent level and is pointed vertically down via a mounting structure. The effluent level sensor node 806 may include any power source, such as, but not limited to, a battery power source. The effluent level sensor node 806 may include a wireless communication interface with the gateway 104 and/or the network 106. Thus, the effluent level sensor node 806 may be cloud connected either directly or via one or more gateways. The effluent level sensor node 806 may also be wired to the building's electrical power or use other power sources, such as solar.

In embodiments, the effluent level sensor node 806 is automatically powered up. The effluent level sensor node 806 may sense the effluent level using a certain frequency to power up the radar sensor and take one or more readings with different sensor calibration values. By taking the one or more readings, the effluent level sensor node 806 may search for two or more specific target levels. For example, the specific target levels may include, but are not limited to, the level of the liquid manure and the level of foam. Preset data may then been transferred to the cloud. A preset thresholds may then allow for automated alerts to be sent to pre-defined management levels for best predicting overflows, foam problems, and planning effluent application.

Figure 9:
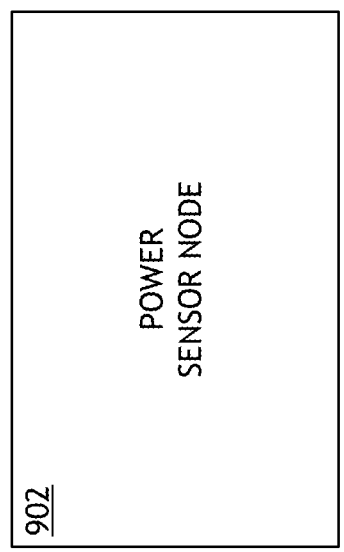
FIG. 9 illustrates a simplified block diagram of one or more sensor nodes of a sensor system, in accordance with one or more embodiments of the present disclosure.

FIG. 9 illustrates a simplified block diagram of the sensor system, in accordance with one or more embodiments of the present disclosure. The sensor system may include one or more power sensor nodes 902. The power sensor nodes 902 may collect power usage associated with power usage of one or more equipment within the CAFO environment. The power usage may then be used to identify an efficiency rating, or the like. By observing trends and understanding the environmental data and the animal's stage of growth, a barn's power usage may be automatically ranked. Furthermore, the efficiency rating may be identified to help growers better adjust their management practices. In embodiments, the power usage is used to identify an efficiency rating. By observing trends and understanding the animal's stage of growth, specific equipment may be identified that are in operation on site. By understanding typical power usage and understanding the usage of individual electrically powered equipment in a barn, visibility into what equipment is running may be identified. Such equipment may also be logged with a timestamp. The data may then be used to control one or more heating, ventilation, or air conditioning (HVAC) systems or equipment, such as, but not limited to, optimizing which fans are running or which heaters should run at which times of day.

FIG. 10 illustrates a simplified view of the sensor system, in accordance with one or more embodiments of the present disclosure. In embodiments, the sensor system includes one or more components for animal sorting, such as, but not limited to, an ear tag sensor node 1002. The ear tag sensor node 1002 may include one or more vibrational units which are configured to vibrate for steering the livestock animal. Some animals, such as pigs, are very difficult to sort. Upon sorting for moving from one pen to another or to loan onto or off of a truck or trailer, caregivers in the industry know that the animals are known to go in any direction other than the one they are supposed to go.

The ear tag sensor node 1002 may be used to individually identify animals, based on a radio-frequency identification (RFID) or the like. The ear tag sensor node 1002 may be battery powered and may have wireless capabilities for wirelessly communicating with another cloud-connected device. In embodiments, the ear tag sensor node 1002 include a vibrational functionality. The vibrational functionality may be provided for the purpose of directing the animals in certain directions. For example, directing the animals may be advantageous upon loading or moving the animals. The ear tag sensor node 1002 may include a small battery-powered vibrator within the ear tag. The ear tag sensor node 1002 may also be coupled to each ear. Upon sorting, the wireless, cloud or edge-connected device communicates a certain protocol to each animal's ear tags, activating a sorting algorithm. The sorting algorithm may accommodate for each animal and pen, guiding each animal to the exit via shortest path, fastest time, or best route. The sorting system may thus improve a rate of loading and/or unloading, reducing the chance for humans or animals to be accidentally injured. Another benefit is to reduce the amount of time necessary for these unloading and/or unloading events, reducing stress on the animals and reducing the chance of inhumane animal treatment taking place. The sensor system may guide the animals to the gate by firing the ear-mounted vibrator. For example, firing the right-hand vibrator, the animal would go left and by firing the left-hand vibrator, the animal would go right. By firing both vibrators, the animal would proceed forward. Upon use when loading or unloading a truck, the cloud-connected gateway would likely be located on the truck or trailer.

FIGS. 11A-11H illustrates a simplified view of the user interface 114 of the sensor system 100, in accordance with one or more embodiments of the present disclosure. The user interface may provide visibility into the status and failure modes that exist inside the sensor system. In particular, the user interface may sort the sensor data within a hierarchy based on the CAFO environment. In this regard, the CAFO environment may be organized based on the sites in which the operator owns. The sites may each include one or more barns. Each of the barns may further include one or more rooms or pens. The user interface may sort the sensor data into a site level, barn level, room level, or floor level hierarchy. As depicted, the user interface may display the various lists according to the selected context. Such selected context may include one or more of a site list, a barn list, a room list, a selected sensor node, or any other context described herein. Although not depicted, the hierarchy may also be broken into multiple floors, where the building (e.g., swine barn, poultry barn, and the like) includes a multi-story building.

FIG. 11A illustrates the user interface 114 of the sensor system 100 with a site list including a site level overview of one or more sites. The site level overview may include information, such as, but not limited to, a site identifier, a quantity of livestock which are present at the site, and one or more conditions associated with the sensors. Such sensors may include, but are not limited to, water sensors, effluent sensors, environment sensors, and feed sensors. An application may include a site view. For example, a user may own one or more sites, each site may include one or more barns. The user interface may rank the sites by performance or other issues. By ranking the sites, the operator may visually determine which sites need attention. The user interface may thus provide a summarized of information at the sites.

FIG. 11B illustrates the user interface 114 of the sensor system 100 with a barn list including a barn level overview of one or more barns present at a site. The barn level overview may include information, such as, but not limited to, a barn identifier, a quantity of livestock which are present at the site, and one or more conditions associated with the sensors. Such sensors may include, but are not limited to, water sensors, effluent sensors, environment sensors, and feed sensors. An application may include a barn view. The user may include one or more barns on a site. The barn view may provide a ranking of the barns by performance or other issues. The barn view may visually indicate which barns needs attention. Thus, the barn views may provide a summarized visualization of information at the barns.

Figure 11C:
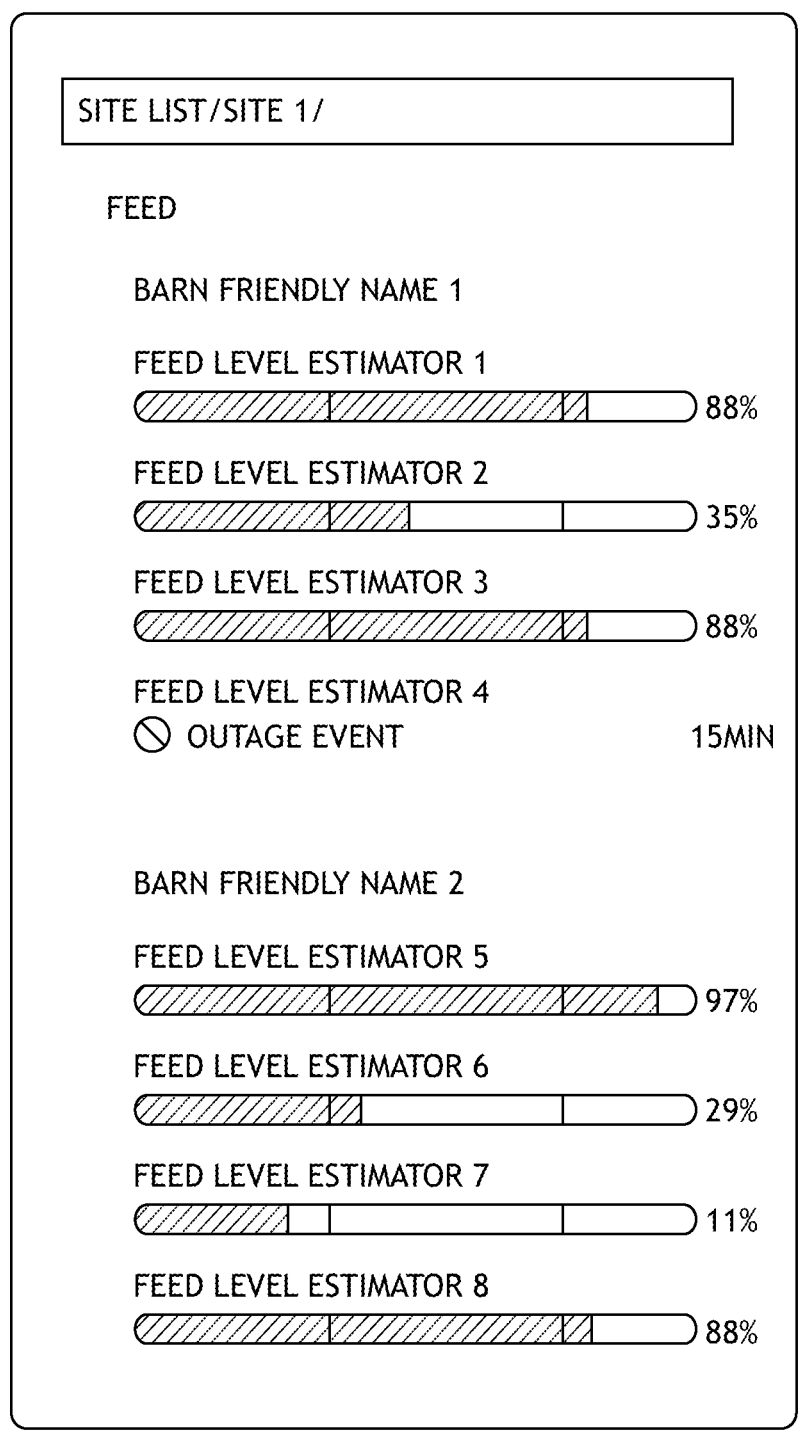
FIG. 11C illustrates a user interface of a sensor system with a barn list including a feed overview of one or more barns present at a site, in accordance with one or more embodiments of the present disclosure.

FIG. 11C illustrates the user interface 114 of the sensor system 100 with a barn list including a feed level overview of one or more barns present at a site. The feed level overview may include information, such as, but not limited to, a percentage of feed for one or more feed bins. The information may also include one or more thresholds. The thresholds may be based on the percentage quantity of feed left in the bins. For example, an operator may set one or more warning thresholds at which the operator may be notified when the feed level falls below the threshold. The information may also indicate when the feed sensor has experienced an outage event, such that the information is no longer being broadcast to the server. An application may include a room view. Each barn may include one or more rooms. The rooms may be ranked by performance or other issues and further indicate which rooms need attention. The room view may thus provide a summarized visualization of information in the rooms.

Figure 11D:
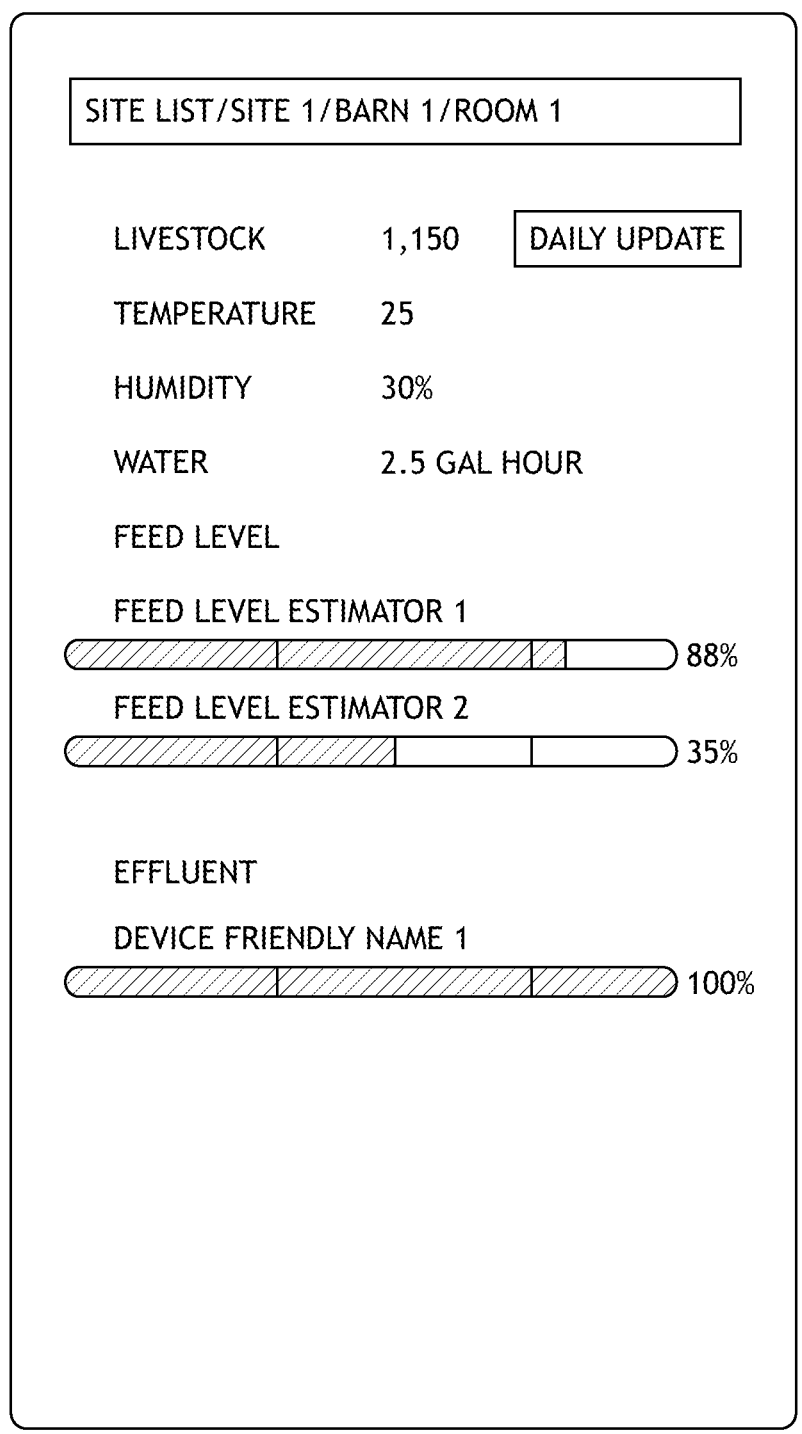
FIG. 11D illustrates a user interface of a sensor system with a room list including a room level overview of a room of a barn present at a site, in accordance with one or more embodiments of the present disclosure.
Figure 11E:
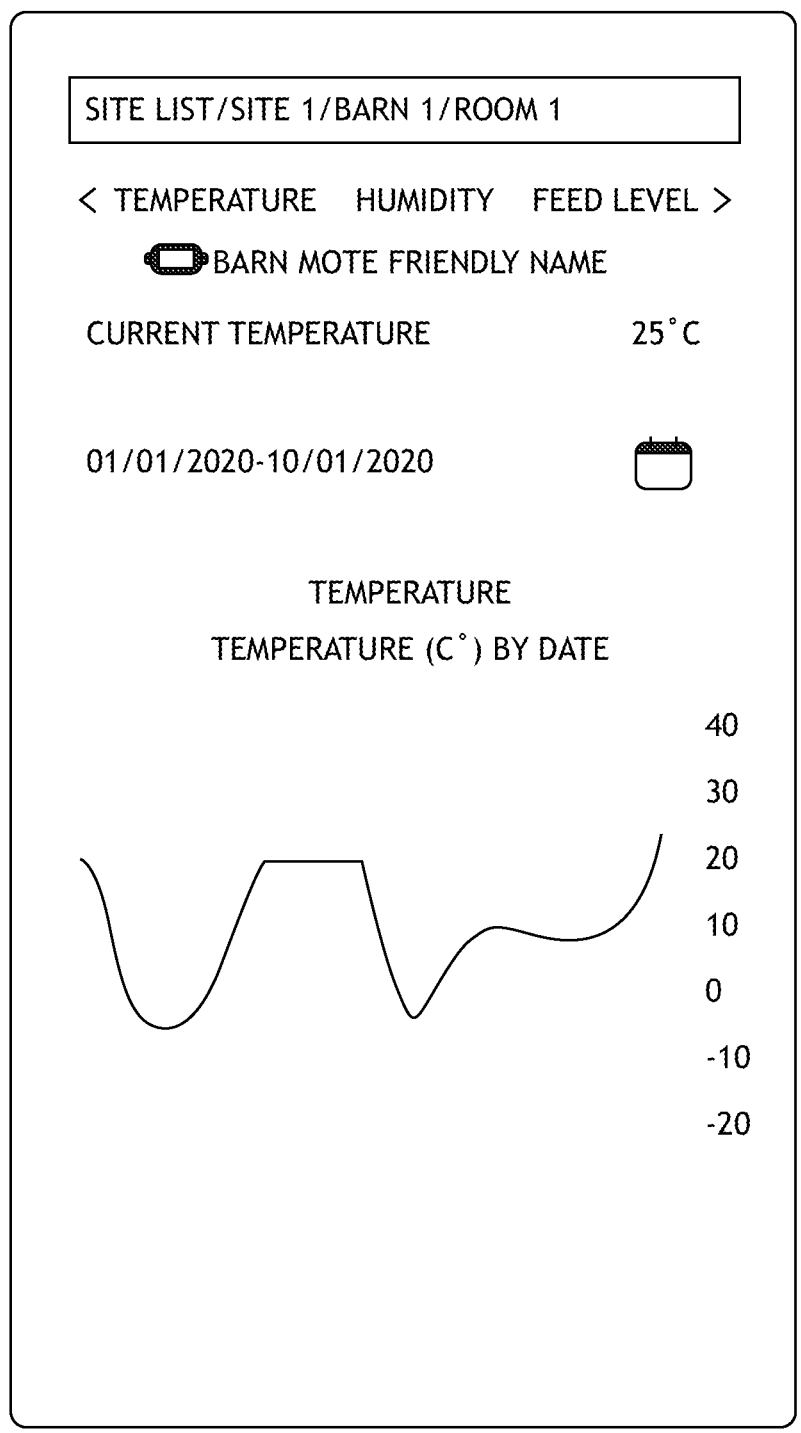
FIGS. 11E-11H illustrates a user interface of one or more sensors nodes present in a room of a sensor system, in accordance with one or more embodiments of the present disclosure.
Figure 11F:
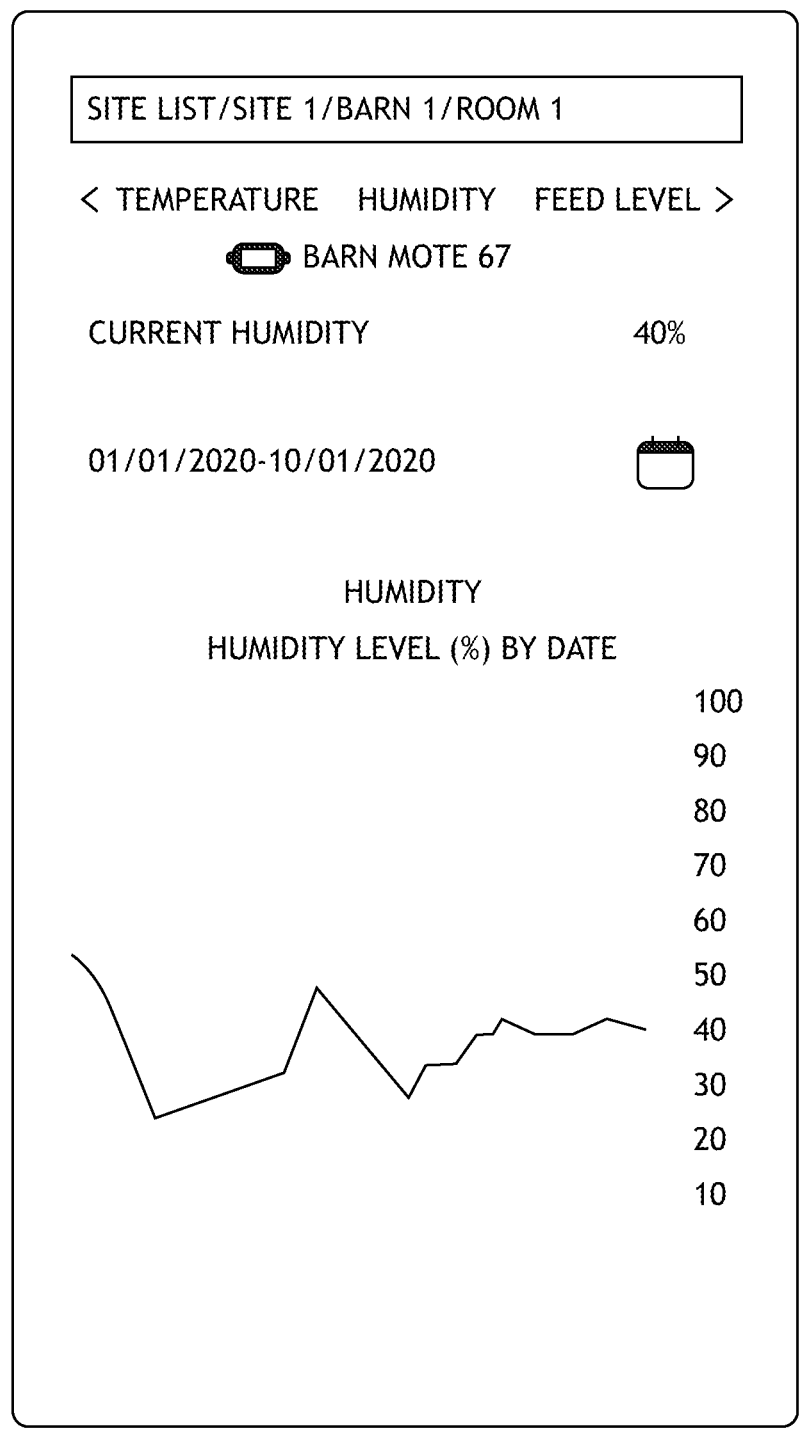
Figure 11G:
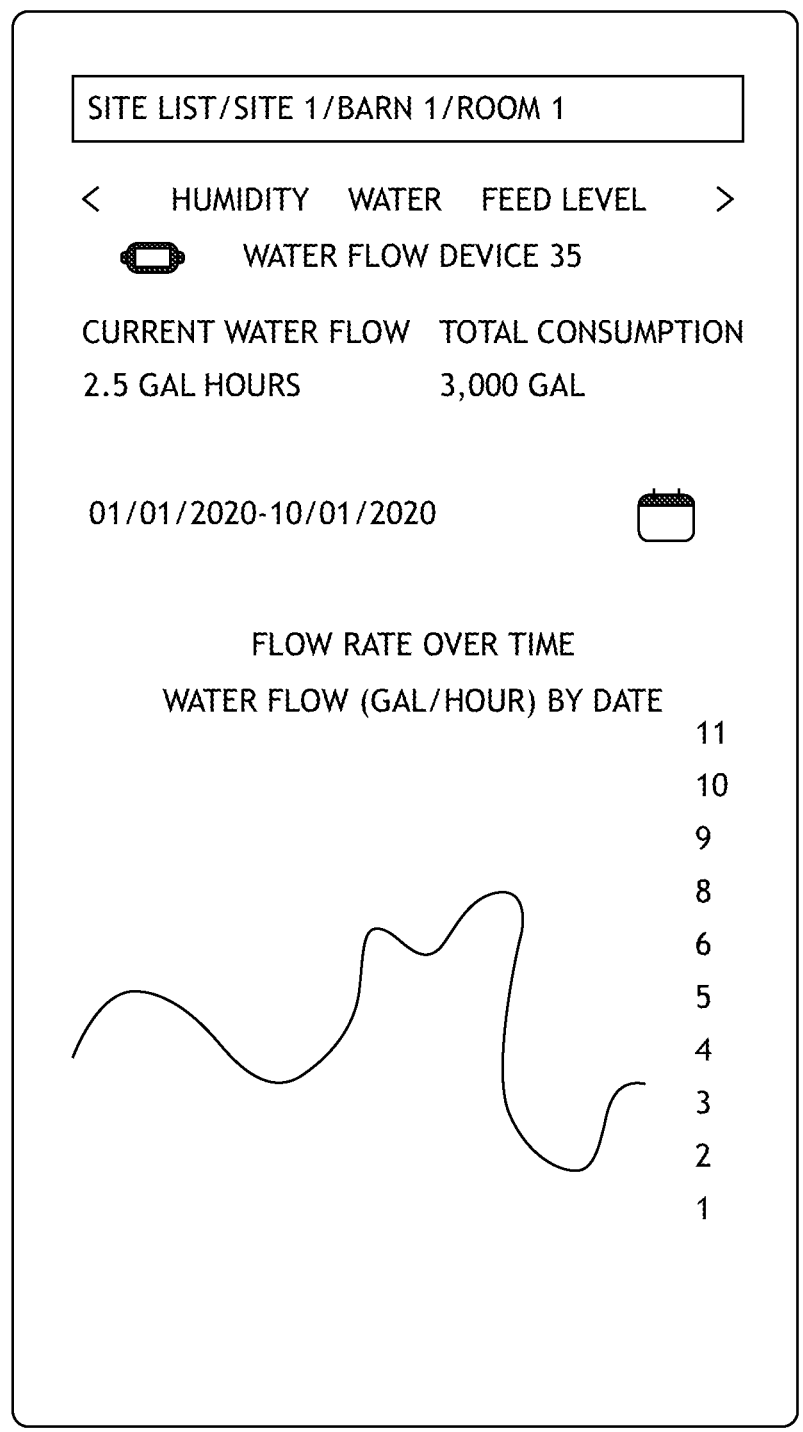
Figure 11H:
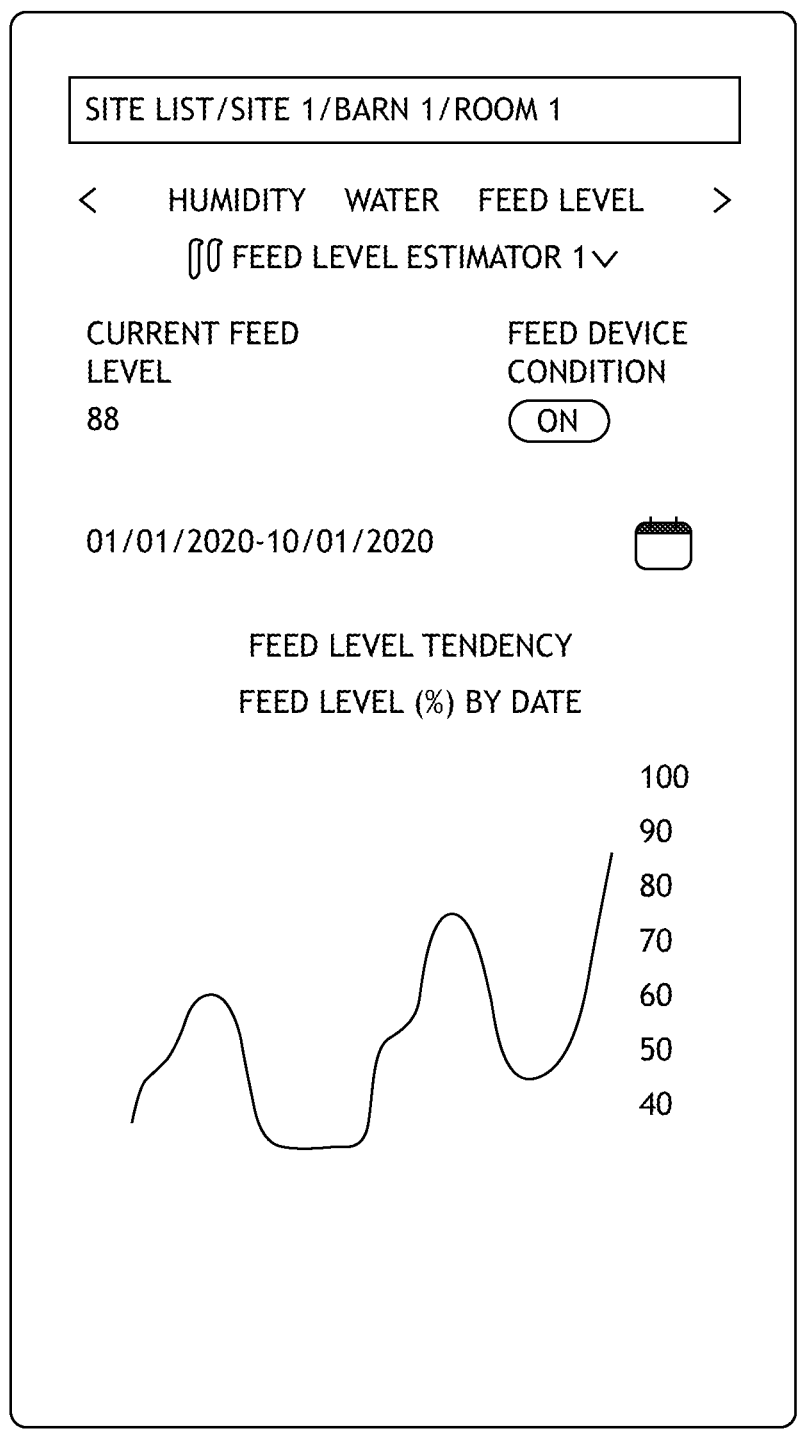

FIG. 11D illustrates the user interface 114 of the sensor system 100 with a room list including a room level overview of a room of a barn present at a site. The room level overview may include information, such as, but not limited to, a room identifier, a quantity of livestock which are present in the room, and one or more conditions associated with the sensors. Such sensors may include, but are not limited to, water sensors, effluent sensors, environment sensors, and feed sensors. The information may also include a percentage of feed for one or more feed bins. The information may also include one or more thresholds. The thresholds may be based on the percentage quantity of feed left in the bins. For example, an operator may set one or more warning thresholds at which the operator may be notified when the feed level falls below the threshold. The information may also indicate when the feed sensor has experienced an outage event, such that the information is no longer being broadcast to the server. Similarly, the effluent information may include one or more thresholds at which warnings may be provided when the effluent levels exceed a threshold. The environment sensors may include, but are not limited to, temperature and humidity sensors.

FIGS. 11E-11H illustrates the user interface 114 of the sensor system 100 with one or more sensors or sensor nodes present in a room of a barn of a site. The sensors may include a number of information, such as, but not limited to, a temperature, a humidity, a feed level, or a water level. The information may also be recorded and provided in graphical form based on the date of the sensor readings.

It is further contemplated that the user interface may include a pond level card view or a tank level card view. For example, a user may have one or more sensor nodes recording level data from tanks or ponds and/or sensor nodes monitoring the pumps moving liquid in and out of the tank. The data may be collected and displayed using a card view based interface. A number of types of data may be shown on the card view based interface, such as, but not limited to, a chart of level over time, an estimated volume, a fill rate, a drain rate, a pump run time, a temperature, and the like.

It is further contemplated that the user interface may include a livestock card view. For example, a user may own one or more sensor nodes which record activity data from pens and/or one or more sensor nodes which record users moving in and out of the pens. The data may be collected and displayed using a card view based interface. A number of types of data may be shown on the card view based interface, such as, but not limited to, a number of animals in a pen, an estimated health based on activity, a time spent husbanding animals, a treatment given to animals, a building telemetry, a feed level, a building fault, an equipment fault, and the like.

Although much of the present disclosure has been directed to a sensor system included in a CAFO environment, this is not intended as a limitation on the present disclosure. It is further contemplated that one or more embodiments of a sensor system described herein may be applicable to other environments, such as agricultural and transport environments. The sensor system may also be useable in a transportation environment, such that the sensor system may be considered a transportation sensor system.

Figure 12:
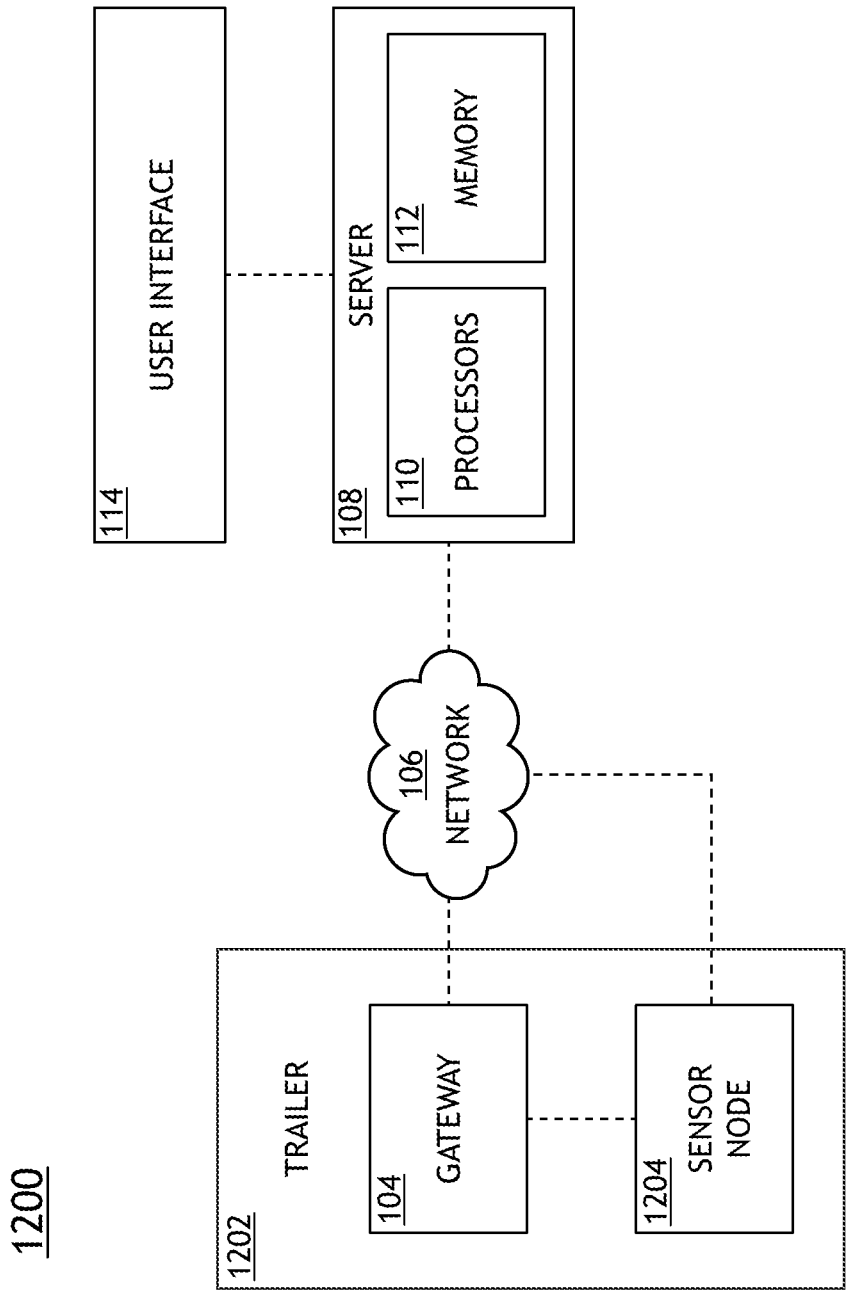
FIG. 12 illustrates a simplified block diagram of a transport sensor system, in accordance with one or more embodiments of the present disclosure.

FIG. 12 illustrates a simplified block diagram of a transport sensor system 1200, in accordance with one or more embodiments of the present disclosure. The transport sensor system 1200 may use the same or similar hardware as used in barns to understand all the characteristics and conditions of a transport event to help managers to better understand logistics of the transport that can affect animal health, arrival times, departure times, each of which directly can affect the profitability of a livestock operation. The transport sensor system 1200 may include one or more components, such as, but not limited to, the gateway 104, the network 106, the server 108, the user interface 114, a trailer 1202, or a sensor node 1204. The trailer 1202 may be used to transport one or more livestock animals between a number of destinations, such as, but not limited to, a barn, a washing station, an auction house, or a packing plant. Such trailer 1202 may generally include any trailer known in the art. The sensor node 1204 may be disposed within the trailer 1202 for sensing one or more conditions of the trailer 1202. The sensor node 1204 may be communicatively coupled with the server 108 by way of the network 106. The sensor node 1204 may be directly coupled to the network 106 (e.g., via a cellular connection) or may be indirectly coupled to the network 106 by way of the gateway 104.

The transportation sensor system 1200 may include a number of sensor nodes including one or more of environmental monitoring, telemetry, animal counting, and vibration sensing. By the sensor nodes, the transportation sensor system 1200 may automatically determine animal husbandry practices during transport. The transportation sensor system may similarly include a connectivity architecture including one or more of mobile applications, cellular connected devices, satellite-connected devices, or gateway connected devices for moving data to or from a server. Data from the sensor nodes may then be co-mingled with other sensor node data to determine trends and behaviors for the driver.

The transport sensor system 1200 may be applied in a number of contexts. For example, the transport sensor system 1200 may provide traceability between a number of sites, equipment, and the like. Constituents (e.g., swine owners, veterinarians, care givers, genetics companies, packers, meat consumers, and the like) may access traceability data at different levels and with different permissions. The transport sensor system may provide traceability of manure from a pit or lagoon to a transport vehicle and/or to a field via a honey wagon, drag line, or the like. The transport sensor system may provide traceability of manure form a pit or lagoon through a pipe transport network to a field via a pivot irrigation. The transport sensor system may provide traceability of a crop harvest from a harvester to gran cart or field buggy to tractor trailer to crop storage location. The transport sensor system may provide traceability of feed from a feed mill to a feed truck to site and/or feed bin. Traceability of the feed may then be used to associate feed ration attributes to ensure the feed is delivered to the correct feed bin at the right animal production site. The transport sensor system may provide traceability of crop deliveries from one or more specific contracted fields to the correct delivery location. The transport sensor system may provide traceability of livestock (e.g., swine) from one barn at a site to another barn at the site or a different site for biosecurity reasons, and the like. The ability to trace the animals may be advantageous in tracking diseases or viruses back to their origin based on proximity-based data. The transport sensor system may provide traceability of livestock (e.g., swine) from one barn at one or more sites to another barn at another one or more site to ensure traceability for biosecurity reasons. Being able to track the animals back through the production cycle to ensure traceability by consumers at the grocery store as well as enabling livestock producers to verify certain production practices in order to justify a higher price on their commodity. The transport sensor system may provide traceability of crops from one field at one or more sites to a storage location (i.e., grain bins or flat storage) at another one or more site to ensure traceability. Being able to track the crop back through the production cycle to ensure traceability by consumers at the grocery store as well as enabling crop producers to verify certain production practices in order to justify a higher price on their commodity. The transport sensor system may provide traceability of artificial fertilizer application from one or more storage sites to one or more fields to verify traceability for sustainability reasons. Being able to track the fertilizer application through the production cycle to ensure traceability enables carbon or sustainability scoring that might justify a higher price on raised commodity.

In embodiments, the trailer includes a truck feed conveyance system. The truck feed conveyance system may be configured to convey feed disposed within the trailer to a feed bin. For example, the truck feed conveyance system may include a stinger for such conveyance. The stinger or some other portion of the feed truck may also include a sensor node. One or more sensor nodes disposed within the trailer may detect a unique identifier from the feed bin. The truck "stinger" may then come in physical proximity to the feed bin. Data may then be compared between the planned feed for that bin and the feed in the feed truck storage compartment. The sensor node may then act as an identifier, specifying a bin number and/or name. The sensor node may be a beacon which emits a unique identifier or a more complex device that might have one or more other functions (i.e., measures feed level at the bin). In some instances, the feed truck delivers the feed by a stinger (e.g., a spout that funnels conveyed feed into the bin). Such sensor node may also emit a unique identifier. In embodiments, the feed truck feed may include a compartment fitted with a feed level sensing apparatus to ensure that the assigned "planned" feed ration is being conveyed to the correct feed bin. One or more of the sensor nodes or the server may then determine the feed disposed within the trailer does not match a selected feed associated with the feed bin by comparing the unique identifier with a selected feed type associated with the feed bin and a feed type of stored in the trailer. One or more of the sensor nodes or the server may also prevent the truck feed conveyance system from conveying feed to the feed bin in response to determining a feed disposed within the trailer does not match a selected feed associated with the feed bin. In the case that the planned feed for a specific feed bin matches the feed in the truck compartment, no alerts are issued to the driver and the feed is allowed to be conveyed to the bin. In the case that the planned feed for the feed bin does not match that in the truck compartment, the driver is alerted and a lock-out on the feed truck conveyance system is activated, preventing the wrong feed from being unloaded. Since it is typical for feed bins to be clustered near one another at a given CAFO building, proximity associations would need to be within approximately 5 feet to be useful for identifying the specific feed bin.

Figure 13:
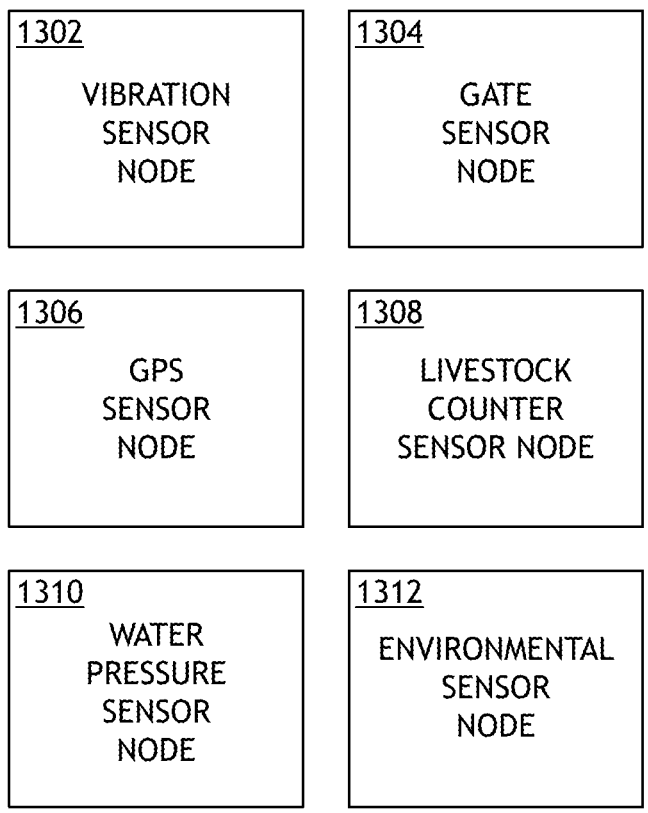
FIG. 13 illustrates a simplified block diagram of one or more of sensor nodes of a transport sensor system, in accordance with one or more embodiments of the present disclosure.

FIG. 13 illustrates a simplified block diagram of one or more of the sensor nodes 1204 of the transport sensor system 1200, in accordance with one or more embodiments of the present disclosure. The sensor node 1204 may include a number of sensor nodes, such as, but not limited to, a vibration sensor node 1302, a gate sensor node 1304, a GPS sensor node 1306, an imaging sensor node 1308, a water pressure sensor node 1310, an environmental sensor node 1312, and the like.

In embodiments, the vibration sensor node 1302 may generate vibration data. The vibration sensor node 1302 may include any suitable sensor for generating the vibration data, such as, but not limited to, an accelerometer. The vibration data may be used to identify when there may have been a rough loading, unloading, or transport event that could have increased the likelihood of livestock injury. The vibration data may also be used to log how long and how much rocking occurred during the load. The log of the duration and the amount of the rocking may then be used to create a profile that can be compared to known good or known bad loading events. A database can be built up to rank and order loading events. The vibration data may also be used to log the roughness of the transportation of livestock. For example, the log may include events where there are fast starts and stops that put animals at risk of injury during the transport period. Vibration profiles of transports can be logged and compared to known good or known bad loading events. A database can be built up to rank and order loading events. The vibration data may also be used to log how long and how much rocking occurred during the unload to create a profile that can be compared to known good or known bad loading events. A database can be built up to rank and order unloading events. The ability to generate such logs may be important when evaluating the performance of the drivers used to haul the trailer 1202. For example, the drivers may be evaluated on one or more criteria, such as, but not limited to, the number of logged events. The number of logged events may indicate various information, such as, but not limited to, the humane treatment of the livestock, the economical transportation of the livestock, and the amount of damage to the livestock.

In embodiments, the gate sensor node 1304 detects a state of a gate of the trailer 1202. The gate sensor node 1304 may include any suitable sensor for detecting the state of the gate, such as, but not limited to, an accelerometer. The state of the sensor may be detected using gate closed and gate open data to understand when a load starts and stops.

In embodiments, the GPS sensor node 1306 generates GPS data. The GPS data may be used in combination with accelerometer data (e.g., data from the vibration sensor node 1302) to understand the route taken by the trailer 1202. To understand how much time animals spent inside a trailer, GPS can be used to timestamp the data. The GPS data may also be used to log one or more of the starting or ending location. The GPS data may also be used to log the route used by the driver together with timestamps. The accelerometer data may also be used to fine tune the GPS data to understand more accurate location. In embodiments, the GPS data is used to predict arrival times. To help Managers understand when they need to be at sites to assist in loading or unloading, trip data can be used to communicate when trucks will arrive at sites. The communication of the trip data may help in efficiency for aligning labor to assist.

In embodiments, the imaging sensor node 1308 is used to count animals going into and out of the trailer 1202. The imaging sensor node 1308 may include any suitable sensor for generating image data, such as, but not limited to, radar or video. To understand how many animals were loaded and unloaded, radar or video can be used to monitor the gate on a trailer and count up or down the number of animals going in and out of a trailer. When used in conjunction with scale information, this can be used to provide average animal weight. Since current state is that humans count and can be incentivized to estimate high or low, the imaging data also can be used to help add an impartial validation. The imaging data can also be used to correlate the number of animals that are loaded versus the number of animals that are unloaded. The ability to correlate is important to determine how much shrinkage (deaths or stolen animals) occurred during transport.

In embodiments, the water pressure sensor node 1310 generates water usage data. The water usage data may then be used to identify an operation of a cooling system. Pressure can be used to indicate that a cooling system was on or off. The pressure data can be logged in conjunction with temperature and humidity data to validate usage under advisable conditions.

In embodiments, the environmental sensor node 1312 generates environmental data of the trailer 1202. The environmental data may include, but is not limited to, temperature data and humidity data. The environmental data may also be logged with one or more other types of data described above, such as, but not limited to, a time-log. Conditions of high temperature and humidity may be detrimental to animal health. The high temperature and humidity conditions may be made worse if there is insufficient air movement. In this regard, the livestock may experience heatstroke or similar health conditions. Similarly, low temperature conditions may be detrimental to animal health. In this regard, the livestock may freeze to death. By correlating temp/humidity data with vehicle speed and trip duration, one can understand if there was significant duress placed on the animals that could compromise their health or increase mortality rates. This is important, especially when transporting animals that are intended to be fed out for finishing (meat) and for replacement breeding animals.

In embodiments, the GPS data is used to log the route taken by the livestock. The route may then be used for contact tracing or site tracing purposes. Using location data and site data, stops along the route may be logged over the life of the trailer. By observing locations that the trailer visited and understanding what type of sites it stopped at, a ranking may be created to understand risk of passing diseases between sites via transport. For example, sites can be identified as wash sites where the truck may be cleaned. Temperature and humidity data can be used to validate if proper procedure was used to wash equipment for the best results. The ability to validate proper washing is important as many livestock operations take livestock trailer cleanings very seriously to mitigate and prevent disease from spreading from one site to another.

In embodiments, the user interface 114 is generated to illustrate transport view data. The transport view data may include a ranking for drivers. The ability to rank drivers may allow for managers to select the drivers based on the various data collected by the sensor nodes 1204, such as, but not limited to, which drivers are most gentile and/or timely in delivering the livestock. The livestock owners may hire such drivers based on an automated ranking of drivers in their area. The automated ranking may include feedback from packers and the receivers of a load of livestock. Thus, drivers may be paid premiums if they provide better service for their transport capabilities. The user interface 114 include a transport view application. For example, a user may include one or more trailers hauling livestock. The transport view application may include a ranking of the trailer and/or the driver by performance or other issues. The transport view application may also provide an indication of when the trailer is expected to arrive. The transport view application may also provide an indication of any environmental conditions during the transportation of the livestock. The transport view application may also include a counting of the livestock. The transport view application may also include a contact tracing to understand other sites that may have been visited by the trailer to help understand how, where and when pathogens could have been transferred. The transport view application may also use temperature data or humidity data to understand when a trailer may have been washed. A determination may be made that the trailer is located has been washed by determining the trailer is at a wash site and comparing the temperature or the humidity to a threshold. The transport view application may also include a summarized visualization of information during transport.

Referring generally again to FIGS. 1A-13, it is recognized that the various sensors described throughout the present disclosure may be communicatively coupled to a controller. The controller (e.g., a local controller and/or remote server) may include one or more processors and memory for executing any of the data processing and/or control steps described in the present disclosure. Furthermore, the various sensor data described herein may be connected with 3rd party software offerings via an application programming interface, or the like.

Those having skill in the art will appreciate that there are various vehicles by which processes and/or systems and/or other technologies described herein can be affected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be affected, none of which is inherently superior to the other in that any vehicle to be utilized is a choice dependent upon the context in which the vehicle will be deployed and the specific concerns (e.g., speed, flexibility, or predictability) of the implementer, any of which may vary.

In embodiments, a machine learning technique may be used to carry out one or more functions of the present disclosure. The machine learning technique may include any type of deep learning technique and/or machine learning algorithm/classifier known in the art, including, but not limited to, a convolutional neural network, an ensemble learning classifier, a random forest classifier, an artificial neural network, and the like. In this regard, the one or more processors described herein may be configured to train one or more machine learning classifiers configured to carry out the one or more functions of the present disclosure.

The one or more processors described herein may include any one or more processing elements known in the art. In this sense, the one or more processors may include any microprocessor-type device configured to execute software algorithms and/or instructions. In embodiments, the one or more processors may consist of a desktop computer, mainframe computer system, workstation, image computer, parallel processor, or other computer system (e.g., networked computer) configured to execute a program configured to operate the systems described throughout the present disclosure. It should be recognized that the steps described throughout the present disclosure may be carried out by a single computer system or, alternatively, multiple computer systems. Furthermore, it should be recognized that the steps described throughout the present disclosure may be carried out on any one or more of the one or more processors. In general, the term "processor" may be broadly defined to encompass any device having one or more processing elements, which execute program instructions from memory. Moreover, different subsystems of the systems described herein (e.g., sensor nodes, gateways, network, servers, user interfaces, and the like) may include processor or logic elements suitable for carrying out at least a portion of the steps described throughout the present disclosure. Therefore, the above description should not be interpreted as a limitation on the present disclosure but merely an illustration.

The memory may include any storage medium known in the art suitable for storing program instructions executable by the associated one or more processors. For example, the memory may include a non-transitory memory medium. For instance, the memory may include, but is not limited to, a read-only memory (ROM), a random-access memory (RAM), a magnetic or optical memory device (e.g., disk), a magnetic tape, a solid-state drive and the like. In another embodiment, the memory is configured to store data collected by the one or more sensors and GPS data generated and/or received by the sensor nodes and/or a GPS unit. It is further noted that memory may be housed in a common controller housing with the one or more processors. In an alternative embodiment, the memory may be located remotely with respect to the physical location of the processors, gateway, network, server, user interface, and the like. In another embodiment, the memory maintains program instructions for causing the one or more processors carry out the various steps described through the present disclosure.

It is noted that the network various components of the systems described herein (e.g., sensor nodes, gateway, network, server, user interface, and the like) may include a network interface (not shown) configured to communicatively couple the various components to the network. The network interface may include any network interface circuitry or network interface device suitable for interfacing with network. For example, the network interface circuitry may include wireline-based interface devices (e.g., DSL-based interconnection, cable-based interconnection, T9-based interconnection, and the like). In another embodiment, the network interface circuitry may include a wireless-based interface device employing GSM, GPRS, CDMA, EV-DO, EDGE, WiMAX, 3G, 4G, 4G LTE, 5G, 6G, WiFi protocols, RF, LoRa, and the like.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, and the like. Furthermore, the results may be stored "permanently," "semi-permanently," temporarily," or for some period of time. For example, the memory may be random access memory (RAM), and the results may not necessarily persist indefinitely in the memory.

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A sensor system comprising:
a plurality of sensor nodes disposed within an agricultural environment; and
a server including one or more processors and a memory, the one or more processors configured to execute a set of program instructions maintained on the memory, wherein the set of program instructions are configured to cause the one or more processors to:
receive sensor data from the plurality of sensor nodes; and
provide a display on a user interface based on the sensor data.

2. The sensor system of claim 1, wherein the set of program instructions are configured to identify a preventative failure condition based on the received sensor data.

3. The sensor system of claim 1, further comprising:
a feed bin;
a feed tube configured to provide a pathway for feed from the feed bin; and
a motor configured to convey the feed from the feed bin by the feed tube;
wherein the plurality of sensor nodes comprises a feed tube sensor node configured to detect a vibration of the feed tube.

4. The sensor system of claim 3, wherein at least one of the feed tube sensor node or the server is configured to determine when the feed bin is one of bridged or empty based on the sensor data from the feed tube sensor node.

5. The sensor system of claim 3, wherein the feed bin is a first feed bin; further comprising a second feed bin and a switch configured to switch a feed source between the first feed bin and the second feed bin; wherein the feed tube is configured to convey feed from the feed source based on the switch; wherein the feed tube sensor node is configured to generate sensor data indicating an acceleration of the switch for determining the feed source has been changed.

6. The sensor system of claim 1, further comprising a feed bin; wherein the plurality of sensor nodes comprises a feed level sensor node configured to detect a feed level of the feed bin.

7. The sensor system of claim 1, further comprising a gateway communicatively coupled to the plurality of sensor nodes, wherein the gateway is configured to collect sensor data from at least one of the plurality of sensor nodes, wherein the gateway is communicatively coupled to the server by at least one of a wired or a wireless connection to a network.

8. The sensor system of claim 1, further comprising a water tank; wherein the plurality of sensors nodes comprises a water flow sensor node configured to generate sensor data indicating a flow rate of water from the water tank or a pressurized water line.

9. The sensor system of claim 8, wherein at least one of the water flow sensor node or the server is configured to identify a water usage profile identifying one or more of a shower-in event or a shower-out event based on the flow rate.

10. The sensor system of claim 8, wherein at least one of the water flow sensor node or the server is configured to identify at least one of a beginning of a livestock growth cycle, an end of the livestock growth cycle, a weight of livestock, a health issue, or when a barn is being soaked prior to power washing based on at least the flow rate.

11. The sensor system of claim 1, further comprising at least one of a water tank, a pit, a pond, or a lagoon; wherein the plurality of sensor nodes comprises a water float sensor node configured to float in at least one of the water tank, the pit, the pond, or the lagoon and generate sensor data for detecting a level of water in at least one of the water tank, the pit, the pond, or the lagoon.

12. The sensor system of claim 1, further comprising a water tank, wherein the water tank comprises a heater, wherein the plurality of sensor nodes comprises a temperature sensor node for measuring at least one of a temperature of the water in the water tank or an ambient temperature, wherein at least one of the temperature sensor node or the server is configured to control the heater based on at least one of the temperature of the water in the water tank or the ambient temperature.

13. The sensor system of claim 12, wherein the temperature sensor node is configured to detect an identification of livestock in proximity to the water tank.

14. The sensor system of claim 13, wherein the temperature sensor node is configured to receive biometric information associated with the livestock in proximity to the water tank; wherein at least one of the temperature sensor node or the server is configured to determine a health of the livestock based on at least one of the temperature of the water, the ambient temperature, the identification of the livestock, or the biometric information of the livestock.

15. The sensor system of claim 1, further comprising a chokepoint, wherein the plurality of sensor nodes comprises a livestock counter sensor node configured to generate sensor data for counting livestock passing through the chokepoint and associate the sensor data to a specific animal.

16. The sensor system of claim 1, wherein the plurality of sensor nodes comprises a door sensor configured to determine a vibration or position of a door; wherein the set of program instructions are configured to cause the one or more processors to determine a state of the door based on the vibration or position of the door and timestamp the state of the door.

17. The sensor system of claim 1, wherein the plurality of sensor nodes comprises an environmental sensor node configured to generate sensor data indicative of at least one of an air quality, a temperature, a humidity, an air pressure, or air speed.

18. The sensor system of claim 1, further comprising a gate, wherein the plurality of sensor nodes comprises a gate sensor node configured to generate vibration or position data indicative of a state of the gate, wherein at least one of the gate sensor node or the server is configured to detect a state of the gate based on the vibration or position data.

19. The sensor system of claim 18, wherein at least one of the gate sensor node or the server is configured to timestamp the vibration or position data for determining a duration a user spent in a room accessible by the gate.

20. The sensor system of claim 1, wherein the plurality of sensor nodes comprises an imaging sensor node, wherein at least one of the imaging sensor node or the server is configured to detect at least one of an activity, an aggression, a back fat, a leg geometry, a size of a loin, a weight, or a density of a livestock based on sensor data from the imaging sensor node.

21. The sensor system of claim 20, wherein the imaging sensor node comprises at least one of a hyperspectral camera including at least one of a radar, a lidar, or a microwave sensor.

22. The sensor system of claim 1, wherein the plurality of sensor nodes comprises at least one of an imaging sensor node or a microphone sensor node configured to generate sensor data of a swine farrowing crate.

23. The sensor system of claim 1, wherein the plurality of sensor nodes comprises an imaging sensor node, wherein at least one of the imaging sensor node or the server is configured to detect livestock in estrus based on sensor data from the imaging sensor node.

24. The sensor system of claim 1, wherein the plurality of sensor nodes comprises at least one of a syringe sensor node, a water flow sensor node, or a feed flow sensor node, wherein at least one of the syringe sensor node, the water flow sensor node, the feed flow sensor node, or the server is configured to track livestock which has received a medication.

25. The sensor system of claim 1, further comprising at least one of an effluent tank, pond, lagoon, or pit; wherein the plurality of sensor nodes comprises at least one of an effluent float sensor node or an effluent level sensor node; wherein at least one of the effluent float sensor node, the effluent level sensor node, or the server is configured to determine a forecast in which at least one of the effluent tank, pond, lagoon, or pit is expected to be full based on sensor data from at least one of effluent float sensor node or the effluent level sensor node, wherein the display on the user interface includes the forecast.

26. The sensor system of claim 1, further comprising a temperature control equipment; wherein the plurality of sensor nodes comprises a power sensor node configured to generate sensor data indicative of a power usage of the temperature control equipment.

27. The sensor system of claim 1, wherein the plurality of sensor nodes comprises an ear tag sensor node, wherein the ear tag sensor node includes a vibrational unit to vibrate for steering livestock.

28. The sensor system of claim 27, wherein the server is configured to engage the vibrational unit for steering the livestock to a selected location.

29. The sensor system of claim 1, wherein the display on the user interface is based on a selected context.

30. The sensor system of claim 1, wherein the plurality of sensors comprises a sensor node configured to generate sensor data indicative of a temperature, a humidity, a water flow, a power consumption, and a vibration, wherein the sensor node is configured to process the sensor data.

31. A transport sensor system comprising:
a trailer configured to haul livestock;
a plurality of sensor nodes disposed within the trailer; and
a server including one or more processors and a memory, the one or more processors configured to execute a set of program instructions maintained on the memory, wherein the set of program instructions are configured to cause the one or more processors to:
receive sensor data from the plurality of sensor nodes; and
provide a display on a user interface based on the sensor data.

32. The transport sensor system of claim 31, wherein the set of program instructions are configured to identify a preventative failure condition based on the received sensor data.

* * * * *